(12) United States Patent
Hyun

(10) Patent No.: US 9,143,824 B2
(45) Date of Patent: Sep. 22, 2015

(54) DISPLAY APPARATUS CONNECTED WITH AT LEAST ONE DEVICE VIA INTEGRATED WIRE INTERFACE AND CONTROLLING METHOD THEREOF

(75) Inventor: Jinho Hyun, Pyeongtaek-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 13/358,714

(22) Filed: Jan. 26, 2012

(65) Prior Publication Data

US 2012/0194741 A1 Aug. 2, 2012

Related U.S. Application Data

(60) Provisional application No. 61/438,244, filed on Jan. 31, 2011, provisional application No. 61/471,663, filed on Apr. 4, 2011.

(30) Foreign Application Priority Data

Apr. 8, 2011 (KR) .......................... 10-2011-0032541

(51) Int. Cl.
| *H04N 21/4363* | (2011.01) |
| *H04N 21/431* | (2011.01) |
| *H04N 21/432* | (2011.01) |
| *H04N 21/436* | (2011.01) |
| *H04N 21/482* | (2011.01) |

(52) U.S. Cl.
CPC ..... *H04N 21/43632* (2013.01); *H04N 21/4312* (2013.01); *H04N 21/4325* (2013.01); *H04N 21/43615* (2013.01); *H04N 21/482* (2013.01)

(58) Field of Classification Search
CPC ................................................ H04N 21/43615
USPC ........................................................ 725/32, 60
See application file for complete search history.

(56) References Cited

U.S. PATENT DOCUMENTS 7,861,017 B2 * 12/2010 Agnihotri et al. ............... 710/60
2002/0129362 A1 * 9/2002 Chang et al. .................... 725/32

FOREIGN PATENT DOCUMENTS

| CN | 1200221 | 11/1998 |
| WO | WO 97/13368 A1 | 4/1997 |
| WO | WO 2005/048581 A2 | 5/2005 |

OTHER PUBLICATIONS

European Search Report dated Jun. 15, 2012 issued in Application No. 12 00 0547.

(Continued)

*Primary Examiner* — Jefferey Harold
*Assistant Examiner* — Sihar Karwan
(74) *Attorney, Agent, or Firm* — Ked & Associates, LLP

(57) ABSTRACT

The present invention includes making a request for information for listing at least one content previously saved in a plurality of source devices sequentially connected via the integrated wire interface to a plurality of the source devices, receiving the information for listing the previously saved at least one content from a plurality of the source devices, displaying the received listing information on a $1^{st}$ region of a screen of the display device, transmitting a signal for requesting an activation of a specific content to the source device which the specific content save in, receiving an AV data corresponding to the specific content from the source device which the specific content saved in, and controlling the received AV data to be displayed on a $2^{nd}$ region of the screen.

8 Claims, 38 Drawing Sheets

(56) References Cited

OTHER PUBLICATIONS

Anandtech: "Intel Light Peak-Lighting up 10 Gbps links in 2011", <URL: http_/www.anandtech.com/_print/_3930> Sep. 16, 2010; (XP007920680).

European Office Action dated May 7, 2013 issued in Application No. 12 000 547.5.
Chinese Office Action issued in related Application No. 201210082530.6 dated Mar. 4, 2014.

* cited by examiner

| txID [8 Byte] | rxID [8 Byte] |
|---|---|
| Command [16 Byte] ||
| Parameter [16 Byte * n] ||
| Payload [16 Byte] ||
| Payload [16 Byte * m] ||

FIG. 29
| Title | source device | file format | creation date (date) | thumbnail presence or non-presence | lately accessed date |
|---|---|---|---|---|---|
| movie 1 | PC | MPG | 2009.2.25 |  | — |
| music 1 | PC | MP3 | 2009.1.4 |  | — |
| photo 1 | USB | JPG | 2009.3.5 |  | 2009.12.3 |
| photo 2 | USB | JPG | 2009.12.5 |  | 2009.12.24 |
| wedding ceremony | USB | AVI | 2009.11.15 | — | — |
| movie 2 | BD Player | AVI | 2009.5.7 |  | 2010.1.4 |
| baseball game | Game Console | EXE | 2009.7.4 | — | — |
| soccer game | Game Console | EXE | 2009.10.21 |  | 2010.1.1 |
| ⋮ | | | | | |

FIG. 31
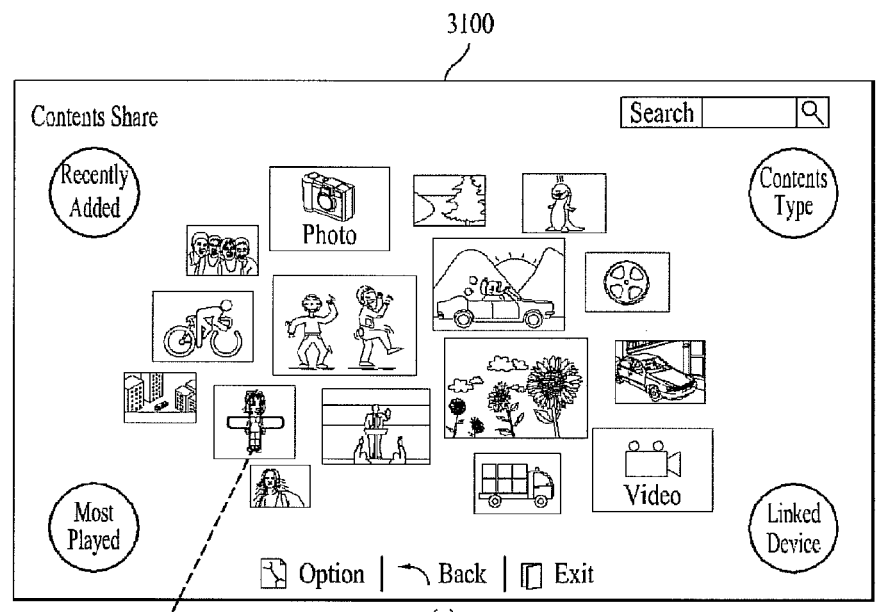
(a)
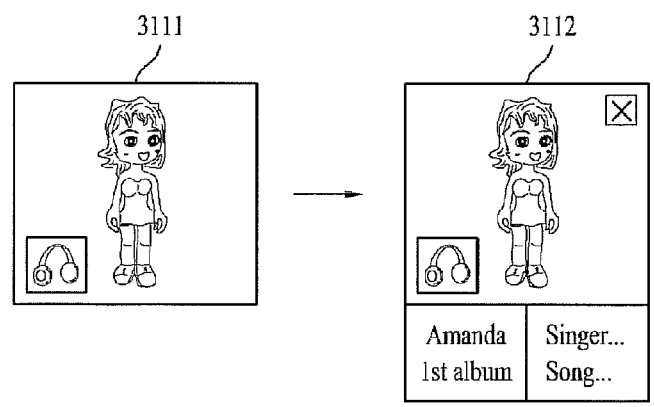
(b)

FIG. 35
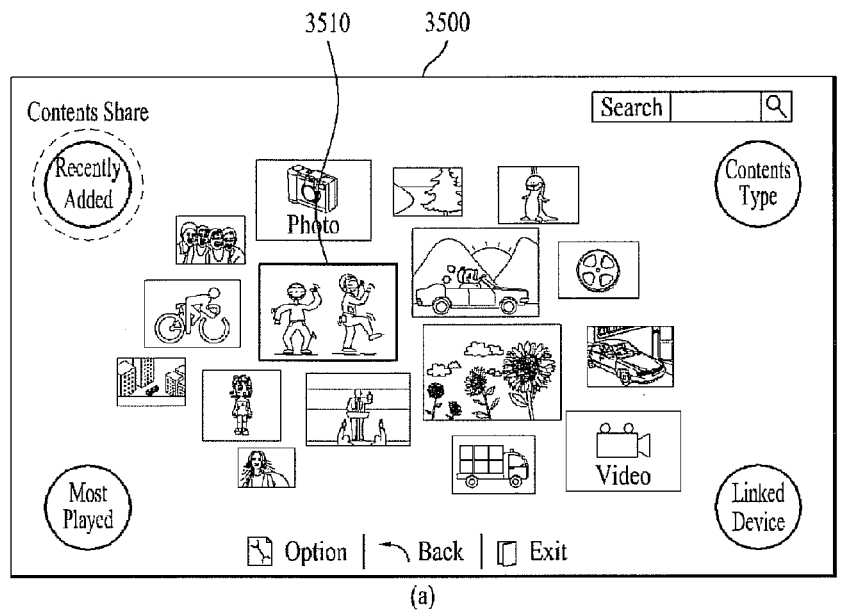
(a)
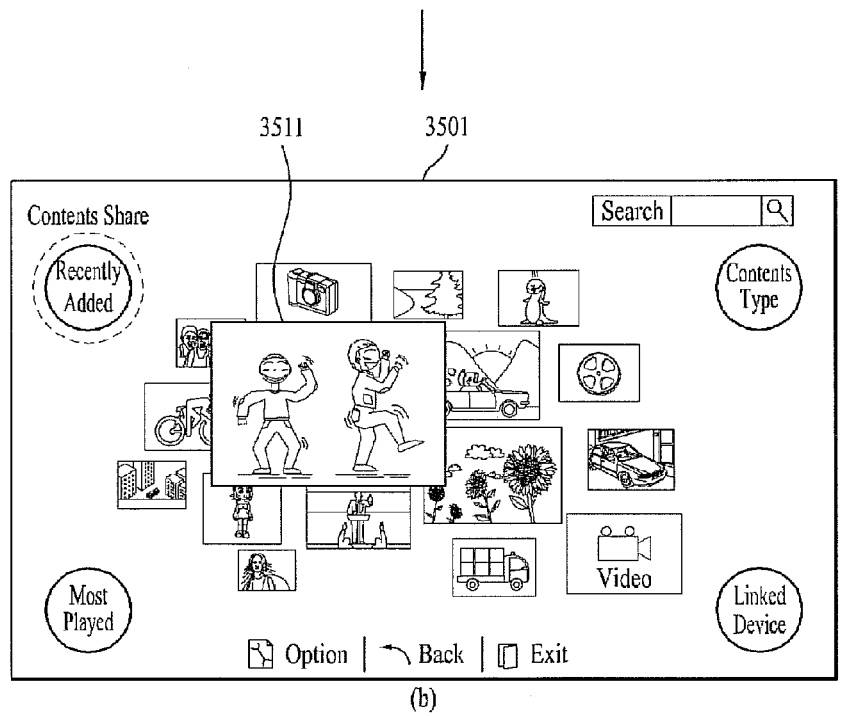
(b)

FIG. 36
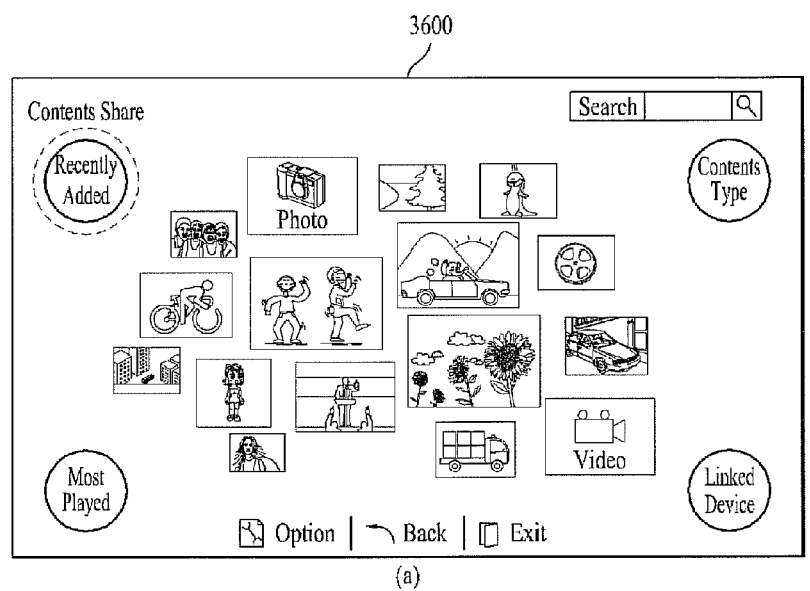
(a)
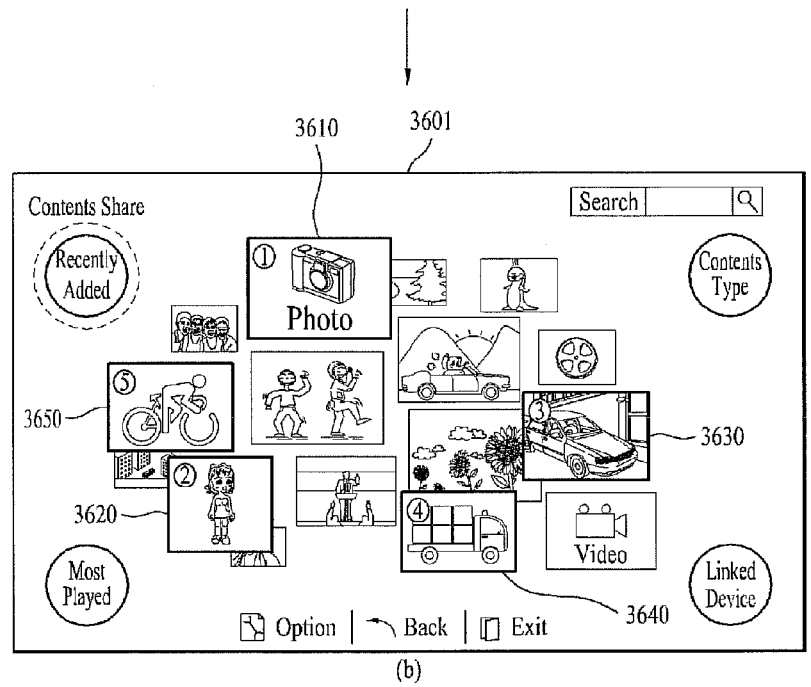
(b)

FIG. 38
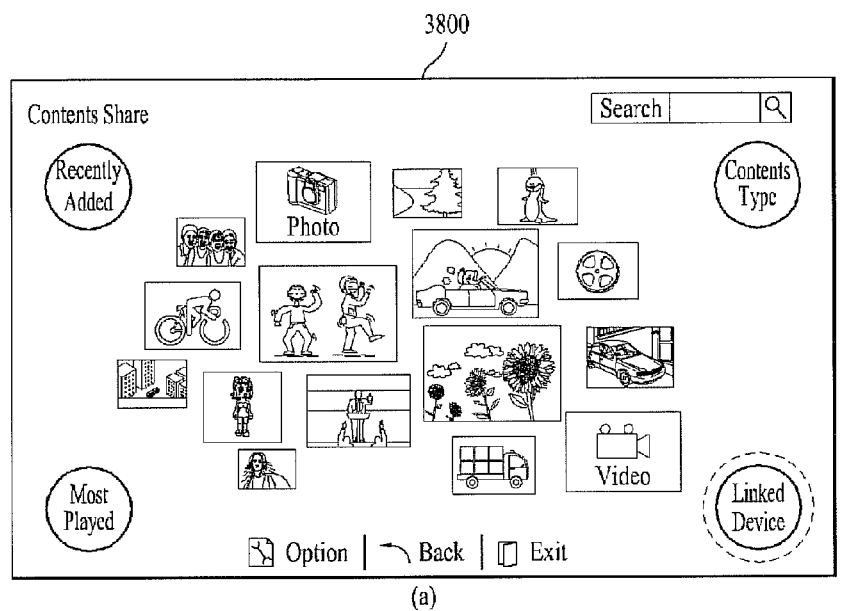
(a)
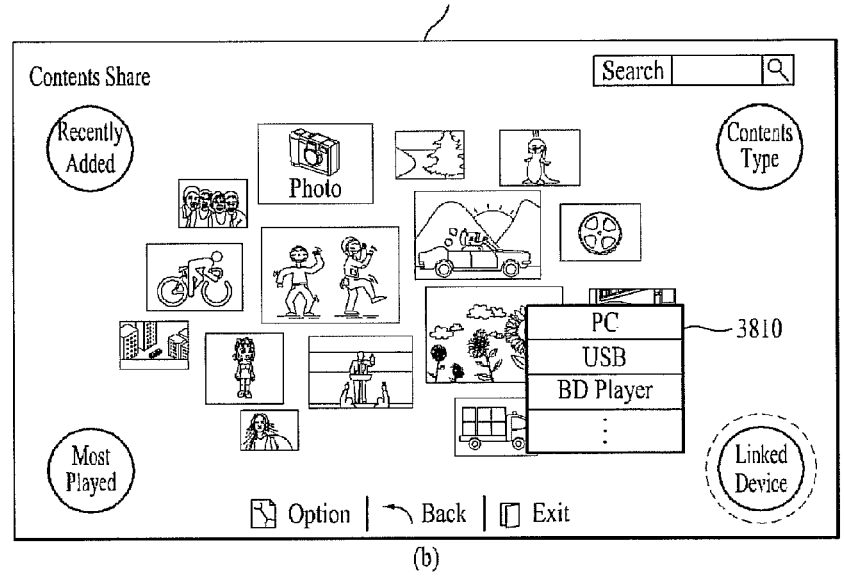
(b)

FIG. 39
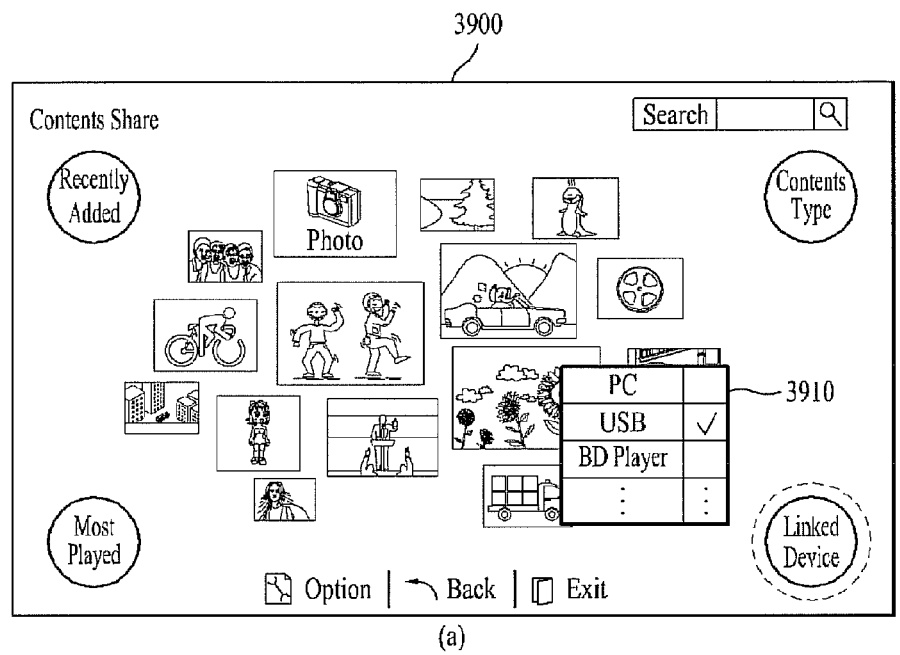
(a)
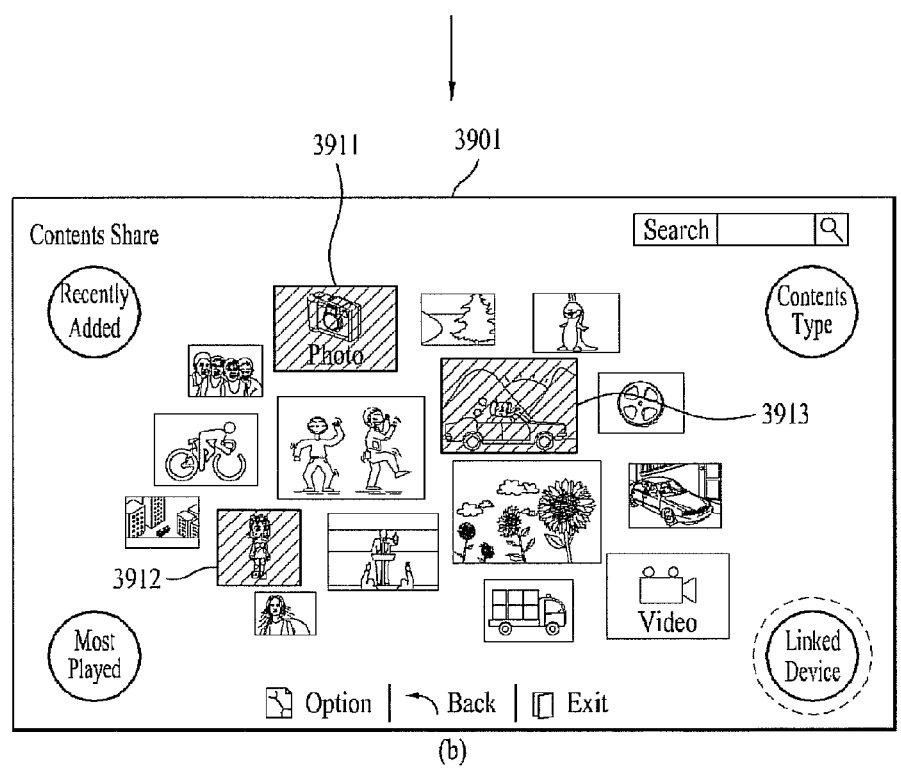
(b)

DISPLAY APPARATUS CONNECTED WITH AT LEAST ONE DEVICE VIA INTEGRATED WIRE INTERFACE AND CONTROLLING METHOD THEREOF

This application claims the benefit of the U.S. Provisional Patent Application Nos. 61/438,244 filed on Jan. 31, 2011; 61/471,663 filed on Apr. 4, 2011 and Korean Application No. 10-2011-0032541 filed on Apr. 8, 2011, which are hereby incorporated by reference as if fully set forth herein.

BACKGROUND OF THE INVENTION

1. Field of the Invention

The present invention relates to a display apparatus, and more particularly, to a display apparatus connected with at least one device using an integrated wire interface and controlling method thereof. Although this invention is suitable for a wide scope of applications, it is particularly suitable for a network TV, a smart TV, an HBBTV (hybrid broadcast broadband television), an internet TV, a web TV, an IPTV (internet protocol television) and the like.

2. Discussion of the Related Art

Recently, the recent development of technology has brought about the advent of unprecedented digital devices. Moreover, in order to connect various kinds of devices, an interface suitable for each of the devices is necessary. In the following description, a current status of a related art is explained with reference to FIG. 1.

FIG. 1 is a diagram of a total system having a sink device connected with a plurality of source devices using complicated interfaces according to a related art. Referring to FIG. 1, a TV 100 according to a related are is connected with various kinds of source devices 120.

However, according to the related art, a number of wire cables are necessary to connect the source devices 120 to the TV 100 that is one example of a sink device. For instance, the number of source devices is limited to the number of connectors of the TV 100. And, the TV 100 is complicatedly surrounded with numerous cables.

Moreover, in order to control the source devices 120, each of the source devices 120 needs a corresponding remote controller 110. For instance, if there are 7 source devices, 7 remote controllers are mandatory.

Besides, according to the related art, a user interface further optimized for a user to facilitate controls of the source devices has not been provided yet.

SUMMARY OF THE INVENTION

Accordingly, this invention is directed to a display apparatus connected with at least one device using an integrated wire interface and controlling method thereof that substantially obviate one or more problems due to limitations and disadvantages of the related art.

An object of this invention is to provide an integrated wire user interface, by which the data transmission between a sink device and a plurality of source devices may be further simplified with increased speed.

Another object of this invention is to define a data transmission protocol at middleware/hardware interface level required for the implementation of an integrated wire interface.

Another object of this invention is to provide a user interface, by which side information may be provided to a user in case that one sink device and a plurality of source devices are present.

A further object of this invention is to provide a user interface, by which side information may be provided to a user in case that a plurality of sink devices and a plurality of source devices are present.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of controlling a display device, which is connected with at least one device using an integrated wire interface, according to one embodiment of the present invention includes the steps of making a request for information for listing at least one content previously saved in a plurality of source devices sequentially connected via the integrated wire interface to a plurality of the source devices, receiving the information for listing the previously saved at least one content from a plurality of the source devices, displaying the received listing information on a $1^{st}$ region of a screen of the display device, transmitting a signal for requesting an activation of a specific content to the source device which the specific content saved in, receiving an AV data corresponding to the specific content from the source device which the specific content saved in, and controlling the received AV data to be displayed on a $2^{nd}$ region of the screen.

In another aspect of this invention, a computer-readable recording medium according to another embodiment of the present invention includes a program for executing the above display device controlling method recorded therein.

In a further aspect of this invention, a display device, which is connected with at least one device using an integrated wire interface, according to a further embodiment of the present invention includes a transmitting module making a request for information for listing at least one content previously saved in a plurality of source devices sequentially connected via the integrated wire interface to a plurality of the source devices, a receiving module receiving the information for listing the previously saved at least one content from a plurality of the source devices, and a display module displaying the received listing information on a $1^{st}$ region of a screen of the display device.

Accordingly, this invention provides the following effects and/or advantages.

First of all, according to one embodiment of the present invention, as an integrated wire interface is provided between a sink device and a plurality of source devices, a data rate may be raised and controls of various kinds of source devices may be facilitated.

Secondly, according to another embodiment of the present invention, a data transmission protocol at middleware/hardware level required for the implementation of an integrated wire interface may be defined.

Thirdly, according to a further embodiment of the present invention, if one sink device or a plurality of sink devices and a plurality of source devices are present, a user is provided with a user interface that provides side information of different formats to enhance user convenience and accessibility.

Besides, the effects of the present invention will be explained in detail later in this specification.

It is to be understood that both the foregoing general description and the following detailed description of this invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 29 is a diagram of a format of data collected from a source device by a sink device according to a $2^{nd}$ embodiment of the present invention;

FIG. 31 is a diagram of a process for displaying side information on a thumbnail image of the main screen shown in FIG. 25 or FIG. 26;

FIG. 35 is a diagram for one example of a process for activating a $1^{st}$ subfunction of the sink device shown in FIG. 25 or FIG. 26;

FIG. 36 is a diagram for another example of a process for activating a $1^{st}$ subfunction of the sink device shown in FIG. 25 or FIG. 26;

FIG. 38 is a diagram for one example of a process for activating a $3^{rd}$ subfunction of the sink device shown in FIG. 25 or FIG. 26;

FIG. 39 is a diagram for another example of a process for activating a $3^{rd}$ subfunction of the sink device shown in FIG. 25 or FIG. 26;

DETAILED DESCRIPTION OF THE INVENTION

This invention is described in detail with reference to the accompanying drawings as follows.

In the following description, suffixes 'module', and 'part' for elements are given to facilitate the preparation of this disclosure only. So, significant meanings or roles are not given to the suffixes themselves. Hence, it is understood that the 'module' and 'part' may be interchangeably used.

Meanwhile, for example, a display apparatus described in the present specification includes an intelligent network TV having a computer support function in addition to a broadcast receiving function. Since an internet function and the like are added to the display apparatus based on the broadcast receiving function, the display apparatus may be equipped with such a convenient interface in use as a manual input device, a touchscreen, a space remote controller and the like. The display apparatus may access internet and computer owing to the support of a wire/wireless internet function to perform such a function as a web browsing function, a banking function, a game function and the like. For these various functions, a standardized universal operating system (OS) may be usable.

Therefore, a network TV mentioned in the present invention may be able to add/delete various applications to/from a universal OS kernel for example, thereby performing various kinds of user-friendly functions. Moreover, for clarity and convenience in the following description of this specification, although a display apparatus, a network TV and the like may be usable together with each other, it will be apparent to those skilled in the art that the present invention covers the modifications and variations of this invention provided they come within the scope of the appended claims and their equivalents.

Furthermore, although embodiments of this invention are described in detail with reference to the accompanying drawings and contents contained therein, this invention is non-limited by the described embodiments.

Terminologies used in the present specification may be selected from general terminologies used currently and widely in consideration of functions in this invention. Yet, the selected terminologies may be changeable in accordance with intentions of those skilled in the art, the custom of the corresponding field, the advent of new technology and the like. Occasionally, some terminologies may bee arbitrarily selected by the applicant(s) and their meanings may be noted at the corresponding description in the present specification. Therefore, the terminology used in the present specification should be construed based on the substantial meaning of the terminology and the overall contents in the present specification instead of being construed as its simple name.

Figure 2:
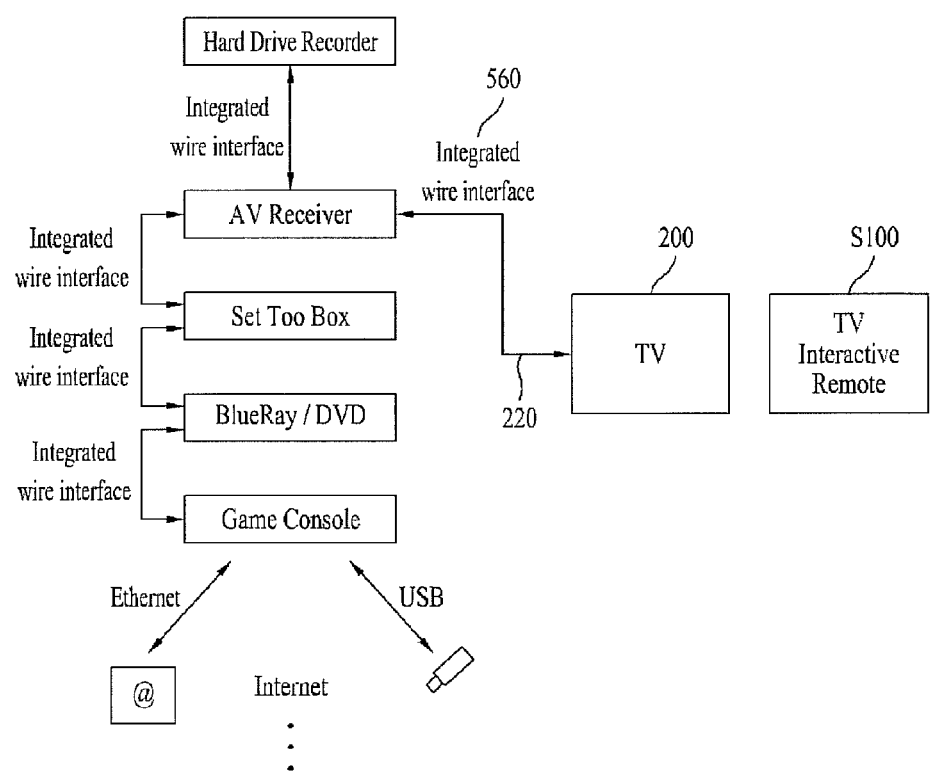
FIG. 2 is a schematic block diagram of a total system having a sink device connected with a plurality of source devices using one integrated wire interface according to one embodiment of the present invention.

FIG. 2 is a schematic block diagram of a total system having a sink device connected with a plurality of source devices using one integrated wire interface according to one embodiment of the present invention. In the following description, a total system having a sink device connected with a plurality of source devices using one integrated wire interface according to one embodiment of the present invention is explained with reference to FIG. 2.

Referring to FIG. 2, first of all, a sink device 200 according to one embodiment needs to be individually connected with a plurality of source devices. In particular, the sink device 200 may correspond to one of a display device, a TV, a DTV, a smart TV, a network TV and the like for example.

In particular, although FIG. 2 shows that it is enough for the sink device 200 to be connected with one source device (e.g., AV receiver in FIG. 2, a different source device, etc.) using an integrated wire interface 220, the rest of source devices including STB, Blue-ray/DVD player, game console, hard drive recorder and the like for example are connected with each other using an inter-source device integrated wire interface.

In this case, the sink device 200 according to one embodiment of the present invention may be able to receive data from other source devices as well as the source device directly connected via the sink device 200. And, the sink device 200 shall be described in detail with reference to FIG. 4 and the like later.

Figure 1:
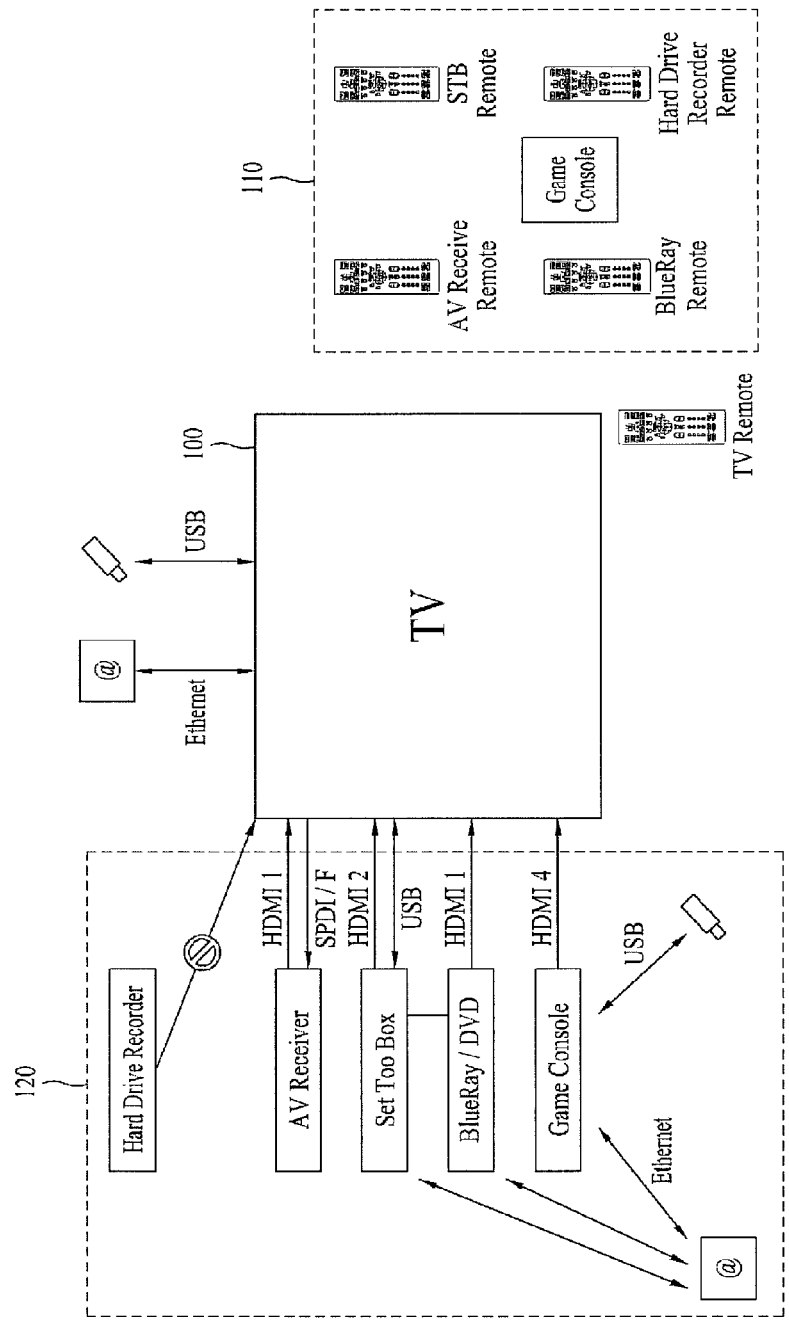
FIG. 1 is a block diagram of a total system having a sink device connected with a plurality of source devices using complicated interfaces according to a related art.

Compared to FIG. 1, FIG. 2 shows that all the source devices are controllable using one remote controller 210 corresponding to the sink device 200. Besides, FIG. 1 has such a problem that a separate remote controller is mandatory for each source device.

Meanwhile, a sink device defined in this specification may correspond to a device configured to output AV data received from a source device for example. In this case, the source device may correspond to a device configured to transmit AV data to the sink device. Of course, the present invention may be characterized in that control data is designed to enable interactive transmission and reception.

Figure 3:
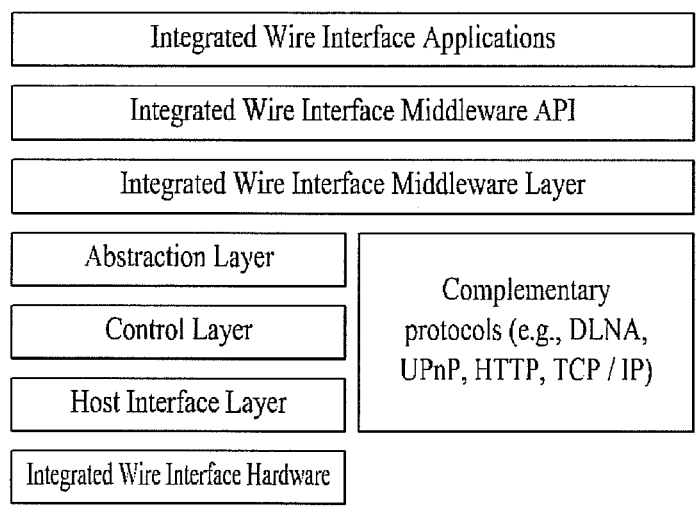
FIG. 3 is a block diagram of a hierarchical structure of connecting a device via an integrated wire interface according to one embodiment of the present invention.

FIG. 3 is a block diagram of a hierarchical structure of connecting a device via an integrated wire interface according to one embodiment of the present invention.

Referring to FIG. 3, an integrated wire interface according to one embodiment of the present invention may be configured with architecture layers connected with each other in 8-layer structure, which is just exemplary. And, the present invention may basically cover the modifications and variations of this invention provided they come within the scope of the appended claims and their equivalents.

Besides, the hardware of the integrated wire interface shown in FIG. 3 shall be described in detail with reference to FIG. 4 layer.

An integrated wire interface application shown in FIG. 3 may perform such a function as content acquisition, management, control and the like.

Integrated wire interface middleware layer may play a role as toolkits for application development and may further transmit a call signal to an abstraction layer and other libraries.

Integrated wire interface middleware API (application programming interface) is the interface configured to control functions provided by an operating system or programming language to be applicable to application programs.

Abstraction layer may play a role in performing a high-level AV streaming function, a USB connection management and device control function and the like.

Control layer may play a role in performing low-level control of local subsystem and remote devices.

Host interface layer may play a role in performing a messaging function between DCL (driver/comparator/load) and IC (integrated circuit) firmware.

And, DLNA, UPnP, HTTP, TCP/IP and the like may be used as complementary protocols for example, which is just exemplary. If necessary, it is apparent to those skilled in the art that other complementary protocols may apply to the present invention to come within the scope of the appended claims and their equivalents.

Moreover, a detailed data flow for source and sink devices to transceive data using the integrated wire interface middleware layers and the integrated wire interface hardware shown in FIG. 3 shall be described with reference to FIG. 6 later.

Figure 4:
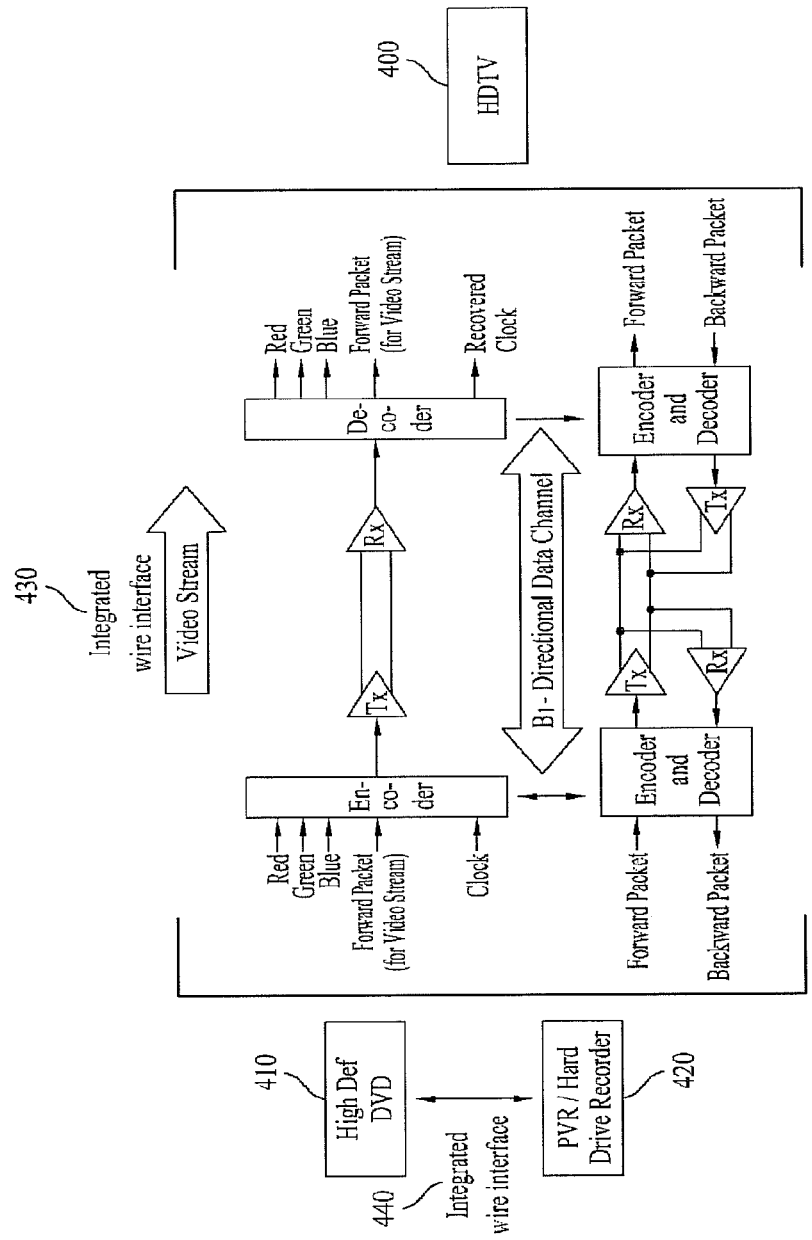
FIG. 4 is a detailed block diagram of an inner circuit of an integrated wire interface according to one embodiment of the present invention.

FIG. 4 is a detailed block diagram of an inner circuit of an integrated wire interface according to one embodiment of the present invention. In the following description, an inner circuit of an integrated wire interface according to one embodiment of the present invention shall be explained in detail with reference to FIG. 4.

Referring to FIG. 4, a sink device 400 according to one embodiment of the present invention is connected with a $1^{st}$ source device 410 via an integrated wire interface 430. And, the 1$^{st}$ source device 410 is connected with a 2$^{nd}$ source device 420 via an integrated wire interface 440. Alternatively, the 2$^{nd}$ source device 420 and the sink device 400 may be directly connected to each other via an integrated wire interface and the 2$^{nd}$ device 420 and the 1$^{st}$ source device 410 may be connected together, which may pertain to the scope of the appended claims and their equivalents.

Although FIG. 4 shows the detailed circuit diagram of the integrated wire interface 430 connecting the sink device 400 and the 1$^{st}$ source device 410 together, the integrated wire interface 440 may be designed to have the same configuration of the circuit diagram of the integrated wire interface 430 shown in FIG. 4.

Referring to FIG. 4, the integrated wire interface 430 may be designed to have two physical channels including a 1$^{st}$ channel and a 2$^{nd}$ channel. In particular, the 1$^{st}$ physical channel may mean the channel for carrying AV data and may be designed to uni-directionally transmit the AV data only. Although FIG. 4 shows a video stream for example, an audio stream is transmitted on the same channel uni-directionally. In particular, AV data saved in the 1$^{st}$ source device 410 may be transmitted to the sink device 400 on the aforesaid 1$^{st}$ physical channel.

The 2$^{nd}$ physical channel may mean the channel for carrying control data and may be designed to transmit the control data bi-directionally. In particular, the control data may be transmitted in a direction from the sink device 400 to the 1$^{st}$ source device 410 or in an opposite direction from the 1$^{st}$ source device 410 to the sink device 400.

In case that a sink device and a source device are connected with each other using the integrated wire interface designed as shown in FIG. 4, it may bring an advantageous effect that a maximum video bandwidth transmitted from the source device to the sink device is increased up to about 13.5 Gbps. Moreover, if the AV channel is designed to have 3 lines, as shown FIG. 20, a data rate may be raised three times higher.

Moreover, it may be able to supply power from the sink device to the source device using the bi-directional data channel shown in FIG. 4 or a separate power line. In case that the integrated wire interface according to one embodiment of the present invention is used, a power of about 5 W may be supplied to an external device for example.

The integrated wire interface shown in FIG. 4 may be designed using category-6 cable for example. In this case, since data is transmitted in a manner of overlapping a clock signal several times and then encoding it at 8 b(bit)/10 b(bit), a click signal line may be unnecessary.

In case that the sink device 400 attempts to use the data saved in the 2$^{nd}$ source device 420, since the 1$^{st}$ source device 410 is situated between the sink device 400 and the 2$^{nd}$ source device 420, a solution for solving this matter is required.

Therefore, in case of a source device a sink device attempts to access, related data may be designed to bypass. And, in order to transmit several AV data simultaneously, it may be necessary to subdivide the above-mentioned 1$^{st}$ channel. This shall be described with reference to FIG. 6 and FIG. 20 later.

Figure 5:
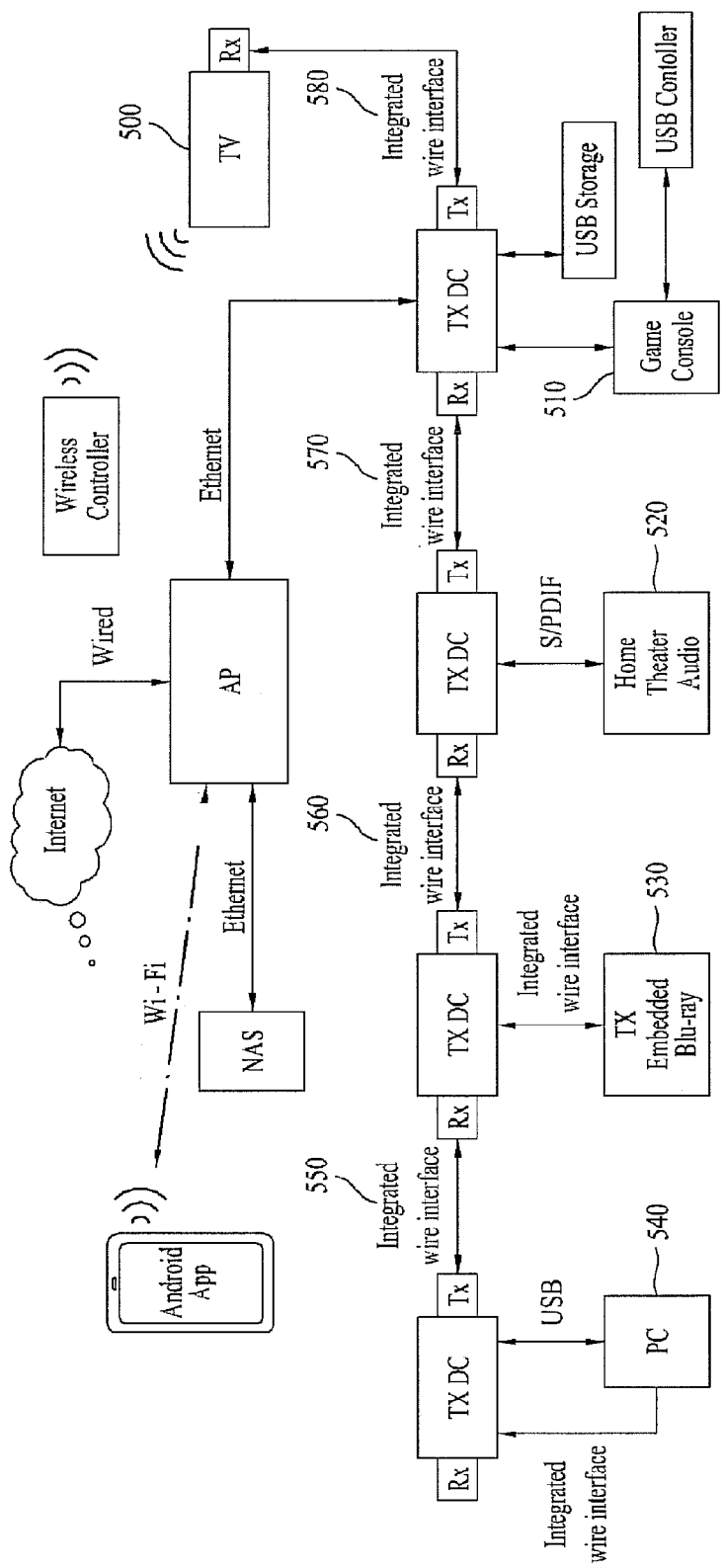
FIG. 5 is a detailed block diagram of a total system having a single sink device connected with a plurality of source devices using an integrated interface according to one embodiment of the present invention.

FIG. 5 is a detailed block diagram of a total system having a single sink device connected with a plurality of source devices using an integrated interface according to one embodiment of the present invention. In the following description, a total system having a single sink device connected with a plurality of source devices using an integrated interface according to one embodiment of the present invention is explained in detail with reference to FIG. 5.

Referring to FIG. 5, if a sink device (e.g., TV, etc.) 500 according to one embodiment of the present invention is connected with a 1$^{st}$ source device (e.g., a game console, etc.) via an integrated wire interface, data communication with a different source device may be enabled.

Of source, assume that source devices controllable by the sink device 500 are connected with one another via integrated wire interfaces. For instance, the 1$^{st}$ source device connected with the sink device 500 via the integrated wire interface 580 is connected to the 2$^{nd}$ source device (e.g., a home theater system, etc.) 520 via the integrated wire interface 570.

The 2$^{nd}$ source device 520 is connected with the 3$^{rd}$ source device (e.g., Blu-ray player, etc.) via the integrated wire interface 560. And, the 3rs source device 530 is connected with the 4$^{th}$ source device (e.g., PC, etc.) 540 via the integrated wire interface 550.

Hence, although the sink device 500 is not directly connected to each of the 2$^{nd}$ source device 520, the 3$^{rd}$ source device 530 and the 4$^{th}$ source device 540, since data communications are enabled between the devices all, the sink device 500 may be able to bring and display data, which is previously saved in at least one of the 2$^{nd}$ source device 520, the 3$^{rd}$ source device 530 and the 4$^{th}$ source devices 540.

Meanwhile, the terminologies 'Tx' and 'Rx' among the terminologies mentioned in the description with reference to FIG. 5 and this specification may basically mean a transmitter and a receiver, respectively, and may be further construed in accordance with the purpose of the entire specification.

Figures 6, 7:
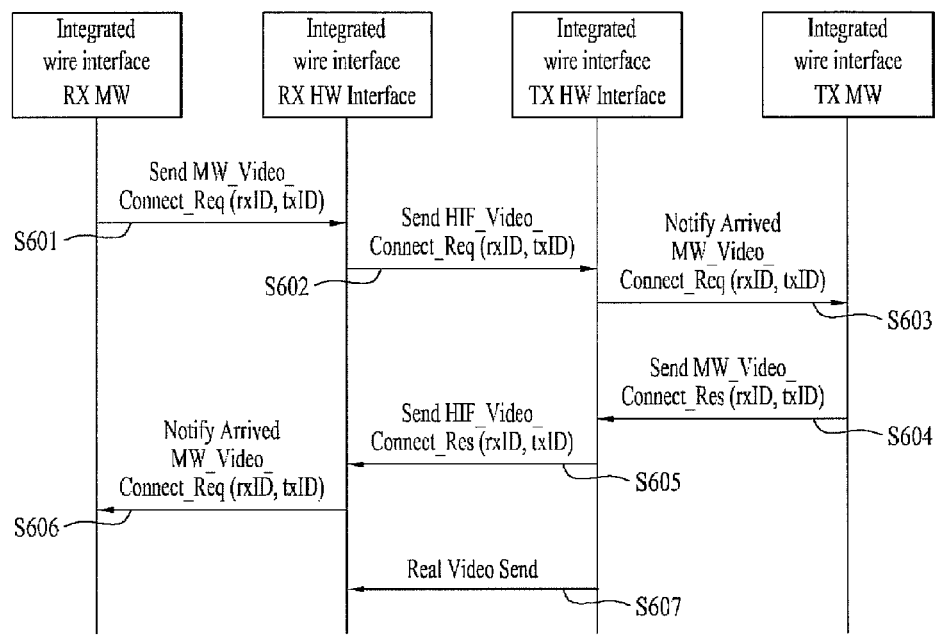
FIG. 6 is a flowchart of data transmission and reception between the devices shown in FIG. 5.
FIG. 7 is a diagram of data format used for the flowchart shown in FIG. 6.

FIG. 6 is a flowchart of data transmission and reception between the devices shown in FIG. 5. In the following description, a process for transmitting and receiving data between a sink device and a source device is explained in view points of middleware and hardware interface. Although video data is explained in the description with reference to FIG. 6, the corresponding description may apply to audio data and control data similarly. The abbreviation 'MW' among the abbreviations shown in FIG. 6 may correspond to middleware for example and the abbreviation 'HIF' may correspond to a hardware interface.

Referring to FIG. 6, first of all, a receiver (RX) middleware of an integrated wire interface transmits a video connection request signal to a receiver (RX) hardware interface of the integrated wire interface [S601]. In doing so, information rxID for identifying a receiver and information txID for identifying a transmitter may be included. Moreover, the receiver of the integrated wire interface may include the sink device shown in FIG. 5.

The receiver hardware interface of the integrated wire interface transmits a video connection request signal to the transmitter (TX) hardware interface of the integrated wire interface [S602]. The transmitter (TX) hardware interface of the integrated wire interface transmits information for notifying that the video connection request signal has been received to the transmitter middleware of the integrated wire interface [S603]. Moreover, the transmitter of the integrated wire interface may correspond to one of the source devices shown in FIG. 5 for example.

The transmitter middleware of the integrated wire interface transmits a video connection response signal to the transmitter hardware interface of the integrated wire interface [S604]. And, the transmitter hardware interface of the integrated wire interface transmits a video connection response signal to the receiver hardware interface of the integrated wire interface [S605].

After the receiver hardware interface of the integrated wire interface has transmitted the information for notifying that the video connection response signal has been received to the receiver middleware of the integrated wire interface [S606], substantial video data is transmitted [S607].

Meanwhile, although FIG. 6 shows the case that the sink device and the source device are directly connected together via the integrated interface, a communication with a specific source device may be possible in case that a different source device is connected between the sink device and the source device via an integrated interface.

Since the rxID information and the txID information may be usable in each of the steps, as shown in FIG. 6, the data shown in FIG. 6 may bypass a source device not having the same ID of a source device a sink device attempts to access.

FIG. 7 is a diagram of data format used for the flowchart shown in FIG. 6. In the following description, a format of data used for the flowchart shown in FIG. 6 is explained.

The data format used for the flowchart shown in FIG. 6 may be designed as the format shown in FIG. 7, which is just exemplary. And, the present invention may basically cover the modifications and variations of this invention provided they come within the scope of the appended claims and their equivalents.

Referring to FIG. 7, a data format transmitted between devices connected together via an integrated wire interface may include such information as txID, rxID, command, parameter, payload length, payload and the like.

The txID may correspond to the data for identifying a source device that transmits AV data for example. And, the rxID may correspond to a sink device that receives AV data for example. In particular, since the data format transmitted by the integrated wire interface includes such information as txID, rxID and the like, it may be designed to enable a communication with a desired source device but bypass a source device not having a corresponding ID.

The command is the data for identifying a type of a command intended to be transmitted from a source device to a sink device, and vice versa, for example. The parameter may contain detailed attribute information on the command.

The payload may mean a region in which substantial video data is included. And, the payload length may include information for identifying a size of the payload.

Figure 8:
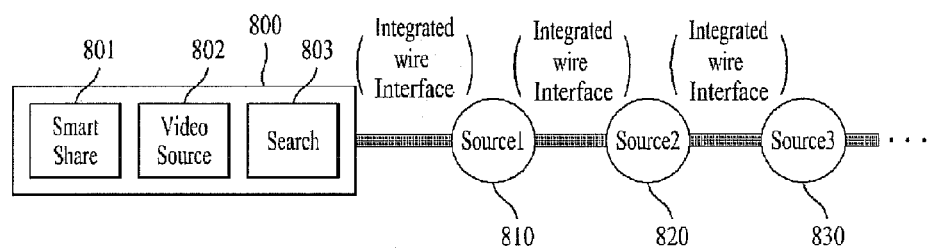
FIG. 8 is a diagram of OSD screen for guiding 3 kinds of functions provided by the sink device shown in FIG. 5.

FIG. 8 is a diagram of OSD screen for guiding 3 kinds of functions provided by the sink device shown in FIG. 5. In the following description, explained with reference to FIG. 8 and FIG. 5 is an OSD screen for guiding 3 kinds of functions provided by a sink device connected with a plurality of source devices via integrated wire interfaces.

First of all, the system shown in FIG. 5 may be configured as summarized into FIG. 5. Referring to FIG. 8, a sink device 800 according to one embodiment of the present invention is sequentially connected with a $1^{st}$ source device 810, a $2^{nd}$ source device 820 and a $3^{rd}$ source device 830 via integrated wire interfaces, respectively.

As mentioned in the foregoing description, the sink device 800 may be able to perform data communications with all the source devices 810, 820 and 830 connected via the integrated wire interfaces. Hence, using the data communications with the source devices, the sink device 800 creates an OSD to guide a $1^{st}$ option 801 for selecting Contents Share, a $2^{nd}$ option 802 for selecting Video Source, and a $3^{rd}$ option 803 for selecting Search and then outputs the created OSD.

The $1^{st}$ option 801 is a function of simultaneously displaying data retained by all the source devices connected with the sink device via the integrated wire interfaces. This shall be described in detail with reference to FIG. 9 later.

The $2^{nd}$ option 802 is a function of primarily displaying types of the source devices connected with the sink device via the integrated wire interfaces and secondarily displaying data retained by a selected specific source device only. This shall be described in detail with reference to FIG. 10 later.

The $3^{rd}$ option 803 is a function of searching data retained by the source devices connected with the sink device via the integrated wire interfaces using a specific keyword. This shall be described in detail with reference to FIGS. 11 to 13 later.

Figure 9:
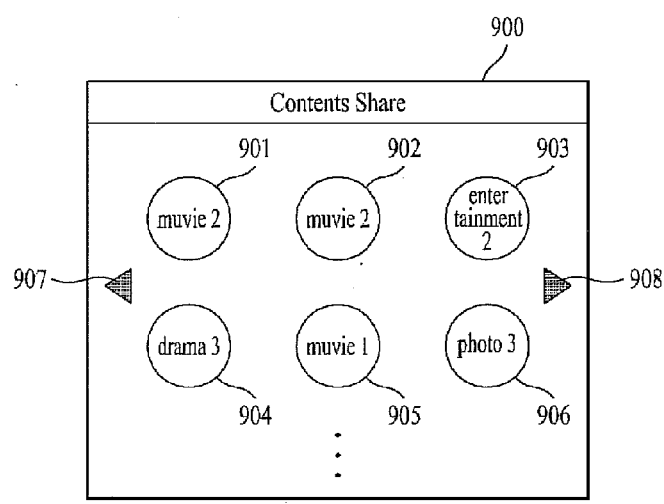
FIG. 9 is a detailed diagram of the option 'contents share' belonging to the 3 kinds of functions of the OSD screen shown in FIG. 8.

FIG. 9 is a detailed diagram of the option 'contents share' belonging to the 3 kinds of functions of the OSD screen shown in FIG. 8. In the following description, explained with reference to FIG. 9 is a function of simultaneously displaying data retained by all the source devices connected with the sink device via the integrated wire interfaces.

Referring to FIG. 9, the sink device 900 connected with the source devices via the integrated wire interfaces accesses each of the source devices and then extracts information indicating the data retained by the corresponding source device. And, the sink device 900 displays a plurality of informations (e.g., title) indicating the data retained by the source devices connected via the integrated wire interfaces, respectively.

For instance, photo 1 901 and photo 3 906 shown in FIG. 9 correspond to informations collected from the $1^{st}$ source device, movie 2 902 and entertainment 2 903 shown in FIG. 9 correspond to informations collected from the $2^{nd}$ source device, drama 3 904 shown in FIG. 9 corresponds to information collected from the $3^{rd}$ source device, and movie 1 905 shown in FIG. 9 corresponds to information collected from the $4^{th}$ source device.

This design may consider the following user's purpose. First of all, when the sink device 900 is used, a user mainly intends to check and output data itself more quickly rather than check whether user-desired data is collected from a specific source device.

Figure 10:
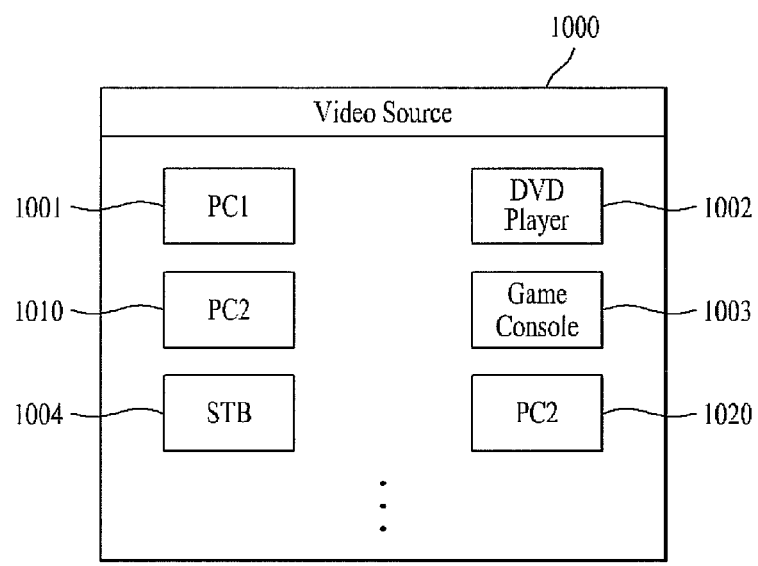
FIG. 10 is a detailed diagram of the option 'video sources' belonging to the 3 kinds of functions of the OSD screen shown in FIG. 8.

FIG. 10 is a detailed diagram of the option 'video sources' belonging to the 3 kinds of functions of the OSD screen shown in FIG. 8. In the following description, explained with reference to FIG. 10 is a function of primarily displaying types of the source devices connected with the sink device via the integrated wire interfaces and secondarily displaying data retained by a selected specific source device only.

Referring to FIG. 10 (a), the sink device 1000 connected with the source devices via the integrated wire interfaces may primarily display information for identifying the source devices connected with the sink device 1000 via the integrated wire interfaces.

In particular, the sink device 1000 may display the source devices in a manner that the source devices 1001 to 1004 belonging to the group of source devices in power-on mode are discriminated from the source devices 1010 and 1020 belonging to the group of source devices in standby mode. As mentioned in the foregoing description, since the integrated wire interface according to one embodiment of the present invention is equipped with a separate power line, it may be able to directly supply power to the source devices in standby mode. Moreover, it may be able to design the source devices to enter a power-on mode by transmitting command data related to 'power-on'.

If a user of the sink device 1000 selects a specific source device (e.g., a game console 1003) [FIG. 10 (a)], the sink device 1050 creates and outputs an OSD 1051 containing information for identifying data retained by the game console [FIG. 10 (b)].

This design may consider the following reason. Namely, in aspect of a user who uses the sink device 1000/1050, if data are transmitted from all the connected source devices, a size of the data is very large or the user may attempt to check the data related to a specific one of the source devices only.

Figure 11:
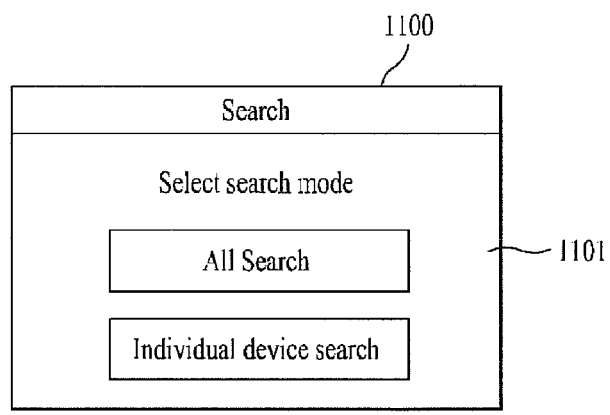
FIG. 11 is a detailed diagram of OSD screen for guiding 2 kinds of modes of the option 'search' belonging to the 3 kinds of functions of the OSD screen shown in FIG. 8.

FIG. 11 is a detailed diagram of OSD screen for guiding 2 kinds of modes of the option 'search' belonging to the 3 kinds of functions of the OSD screen shown in FIG. 8. In the following description, explained with reference to FIG. 11 is a function of searching data retained by the source devices connected with the sink device via the integrated wire interfaces using a specific keyword.

Referring to FIG. 11, in case that a user of a sink device 1100 according to one embodiment of the present invention activates a search function, an OSD 1101 for guiding 2 kinds of search modes is created and outputted. A function 'All Search' shall be described in detail with reference to FIG. 12. And, a function 'searching in a specific device' shall be described in detail with reference to FIG. 13 later.

Figure 12:
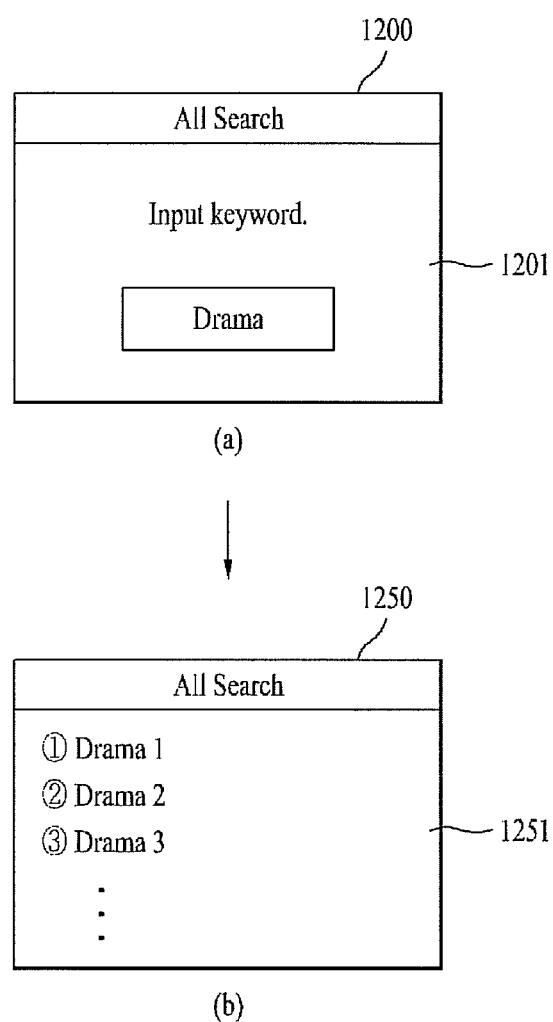
FIG. 12 is a detailed diagram of the option 'all search' belonging to the 2 kinds of functions of the OSD screen shown in FIG. 11.

FIG. 12 is a detailed diagram of the option 'all search' belonging to the 2 kinds of functions of the OSD screen shown in FIG. 11.

Referring to FIG. 12, if the all search function shown in FIG. 11 is activated, a sink device 1200 according to one embodiment of the present invention creates and displays an OSD 1201 for enabling a user to randomly input a keyword [FIG. 12 (a)]. In FIG. 12 (a), assume that the user inputs the keyword 'drama'.

In this case, the sink device 1250 according to one embodiment of the present invention may be designed to filter data containing the keyword 'drama' from all source devices connected to the sink device 1250 via integrated wire interface and to display a corresponding result on an OSD 1251 [FIG. 12 (b)].

Figure 13:
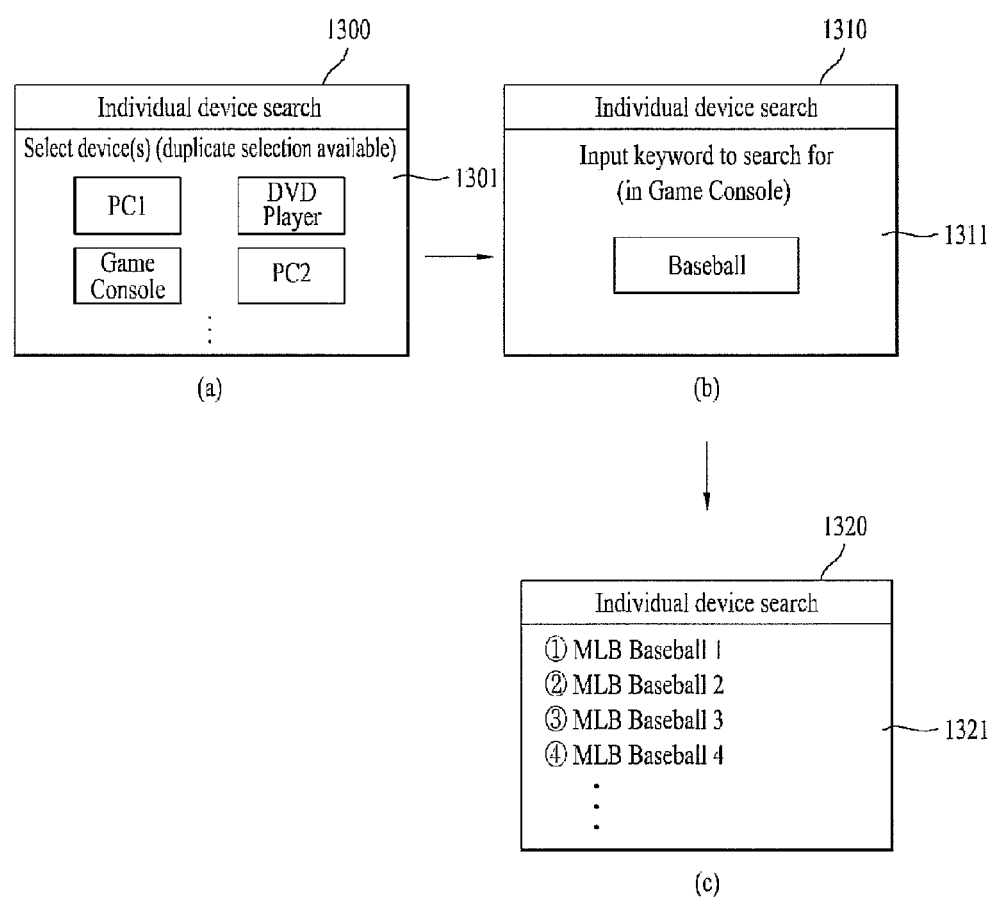
FIG. 13 is a detailed diagram of the option 'searching in a specific device' belonging to the 2 kinds of functions of the OSD screen shown in FIG. 11.

FIG. 13 is a detailed diagram of the option 'searching in a specific device' belonging to the 2 kinds of functions of the OSD screen shown in FIG. 11.

If the function 'searching in a specific device' shown in FIG. 11 is activated, referring to FIG. 13 (a), a sink device 1300 according to one embodiment of the present invention preferentially outputs a list 1301 of source devices to search with a keyword. Moreover, the present invention is characterized in designing at least two source devices, which are to be searched with the keyword, to be selected.

In doing so, assuming that a user selects a game console, referring to FIG. 13 (b), the sink device 1310 creates and displays an OSD 1311 for enabling the user to randomly input a keyword. In FIG. 13 (b), assume that the user inputs the keyword 'baseball'.

Finally, referring to FIG. 13 (c), the sink device 1320 according to one embodiment of the present invention is designed to filter data containing the keyword 'baseball' from all the source devices connected via the integrated wire interface, and more particularly, from the a game console device and to display a corresponding result as an OSD 1321.

Figure 14:
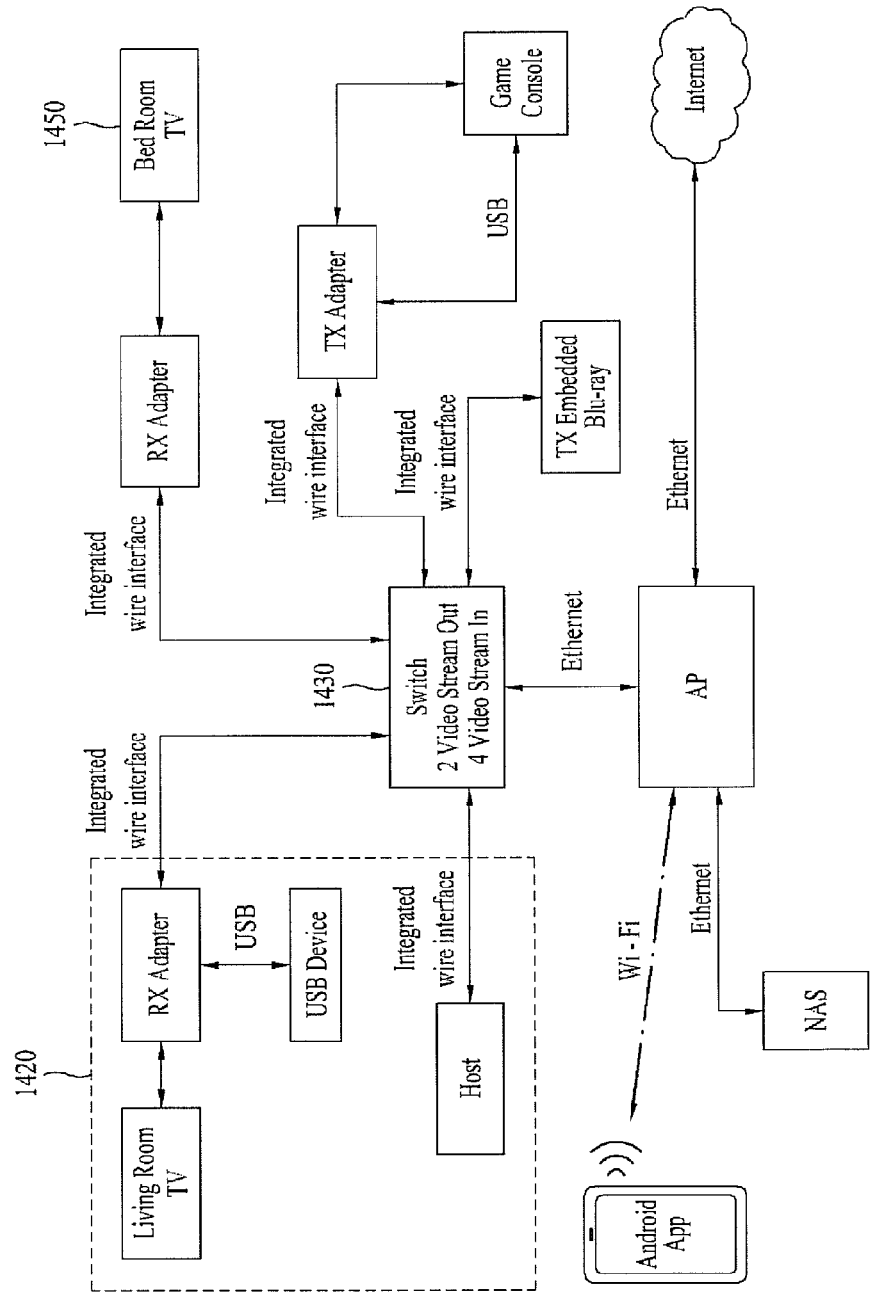
FIG. 14 is a detailed block diagram of a total system having a plurality of sink devices connected with a plurality of source devices using an integrated interface according to another embodiment of the present invention.

FIG. 14 is a detailed block diagram of a total system having a plurality of sink devices connected with a plurality of source devices using an integrated interface according to another embodiment of the present invention. In the following description, explained with reference to FIG. 14 is a total system having a plurality of sink devices connected with a plurality of source devices using an integrated interface according to another embodiment of the present invention. In particular, compared to FIG. 5, FIG. 14 shows that a plurality of TVs 1410 and 1420 are present as sink devices for example and that a hardware 1430 including a switching module is additionally designed. Of course, the above mentioned integrated wire interface may similarly apply to FIG. 14.

Referring to FIG. 14, a plurality of sink devices 1410 and 1420 are connected with a hardware 1430 including a switching module. And, the hardware 1430 is connected with source devices (e.g., game console, Blu-ray, host, etc.) via integrated wire interfaces.

FIG. 14 exemplarily shows that the hardware 1430 is equipped with 4 audio stream-in connectors, by which the present invention may be non-limited. Alternatively, the hardware 1430 may be designed to be connected with one source device via an integrated wire interface in a manner of having one video stream-in connector only. In this case, the source device may be connected with another source device via the integrated wire interface.

If the hardware 1430 including the switching module, as shown in FIG. 14, is additionally designed, it may be advantageous in that AV data received from a source device may be transmitted to each of sink devices individually.

Figure 15:
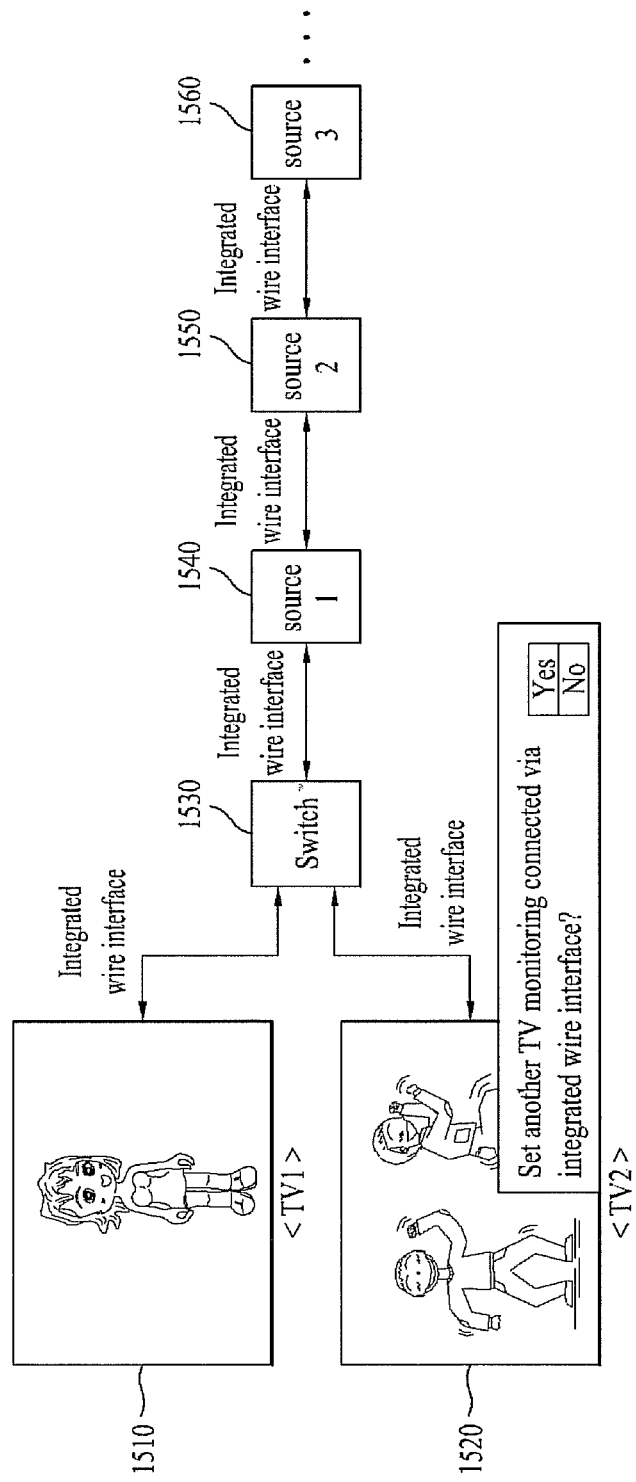
FIG. 15 is a diagram of a $1^{st}$ OSD screen for guiding a monitoring function provided by a random one of a plurality of the sink devices shown in FIG. 14.

FIG. 15 is a diagram of a $1^{st}$ OSD screen for guiding a monitoring function provided by a random one of a plurality of the sink devices shown in FIG. 14. In the following description, explained with reference to FIG. 15 is a $1^{st}$ OSD screen for guiding a monitoring function provided by a random one of a plurality of the sink devices shown in FIG. 14.

Referring to FIG. 15, a plurality of sink devices 1510 and 1520 are connected with a hardware 1530 including a switching module. And, the hardware 1530 including the switching module is connected with a $1^{st}$ source device 1540, a second source device 1550 and a $3^{rd}$ source device 1560 via integrated wire interfaces.

The specific one 1520 of a plurality of the sink devices outputs an OSD screen as a popup window, as shown in FIG. 15, to set a function of monitoring another sink device connected via the integrated wire interface.

The hardware 1530 including the switching module is capable of monitoring data inputted to each sink device and is designed to notify a corresponding result to another sink device.

Figure 16:
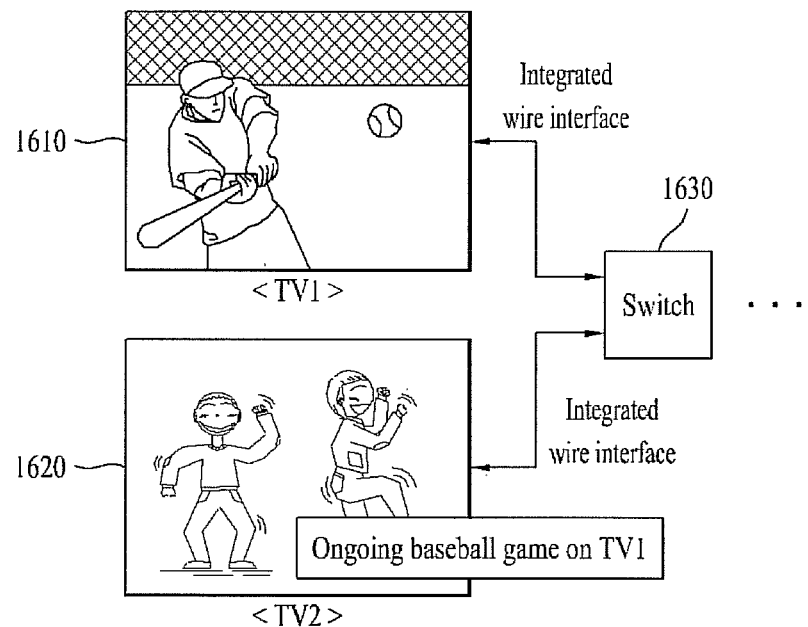
FIG. 16 is a diagram of a $2^{nd}$ OSD screen for notifying a result from monitoring a different source device if a guide monitoring function is set in FIG. 15.

FIG. 16 is a diagram of a $2^{nd}$ OSD screen for notifying a result from monitoring a different source device if a guide monitoring function is set in FIG. 15. In the following description, explained with reference to FIG. 16 is a $2^{nd}$ OSD screen for notifying a result from monitoring a different source device if a guide monitoring function is set in FIG. 15.

First of all, assume that a $1^{st}$ sink device 1610 shown in FIG. 16 activates a baseball game from a specific source device via a hardware 1630 including a switching module. In this case, the hardware 1630 delivers information, which notifies that the $1^{st}$ sink device 1610 has activated the baseball game, to a $2^{nd}$ sink device 1620 currently outputting a general broadcast screen.

Referring to FIG. 16, the $2^{nd}$ sink device 1620 may display an OSD as a popup window to indicate that the $1^{st}$ sink device 1610 has activated the baseball game.

Figure 17:
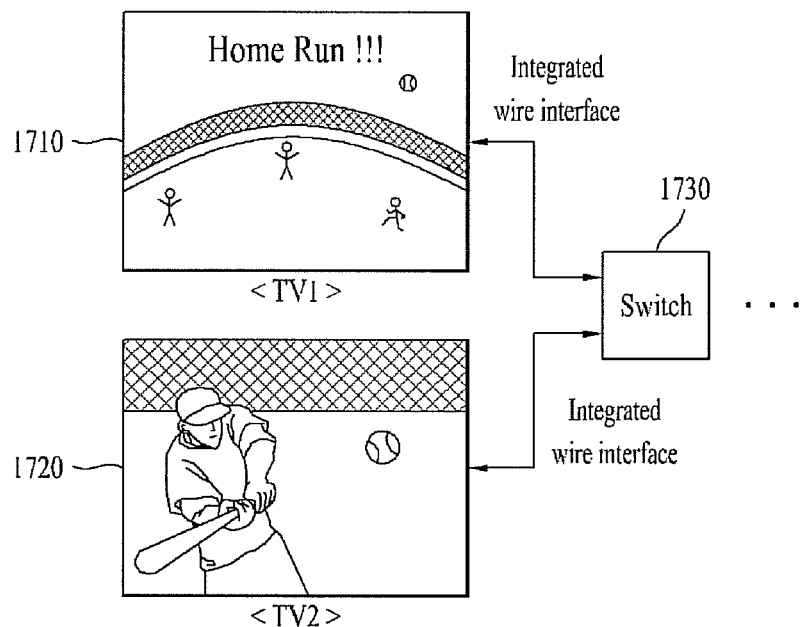
FIG. 17 is a diagram of a $1^{st}$ embodiment of a plurality of sink devices receiving the same data from the source device if the informed information is selected in FIG. 16.

FIG. 17 is a diagram of a $1^{st}$ embodiment of a plurality of sink devices receiving the same data from the source device if the informed information is selected in FIG. 16. In the following description, explained with reference to FIG. 17 are a plurality of sink devices receiving the same data from the source device if the informed information is selected in FIG. 16. Particularly, FIG. 17 assumes a case that a source device corresponds to NAS (network access server) or DLNA (digital living network alliance) device.

Referring to FIG. 17, if the popup window of the OSD shown in FIG. 16 is selected, a $2^{nd}$ sink device 1720 activates the same content of the $1^{st}$ sink device 1710. As mentioned in the foregoing description, since a hardware 1739 including a switching module is equipped with at least two AV stream-out connectors, the AV data received from the same source device may be delivered to each of the different sink devices.

Yet, referring to FIG. 17, the $2^{nd}$ sink device 1720 brings the content activated by the $1^{st}$ sink device 1710 from the beginning and then displays the brought content. If the source device includes one of a game console, a DVD player and the like instead of the NAS or DLNA device, it may be possible to output the same scene, which shall be described in detail with reference to FIG. 18.

Figure 18:
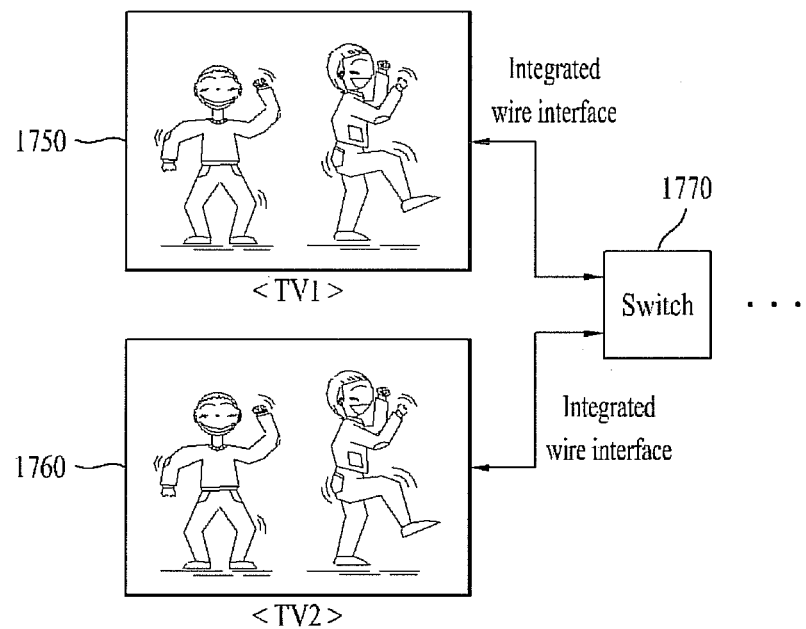
FIG. 18 is a diagram of a $2^{nd}$ embodiment of a plurality of sink devices receiving the same data from the source device if the informed information is selected in FIG. 16.

FIG. 18 is a diagram of a $2^{nd}$ embodiment of a plurality of sink devices receiving the same data from the source device if the informed information is selected in FIG. 16. In the following description, explained are a plurality of sink devices receiving the same data from the source device if the informed information is selected in FIG. 16. Particularly, FIG. 18 assumes a case that a source device corresponds to one of a DVD player, a game console, a PC and the like.

Unlike FIG. 17, FIG. 18 shows that a $1^{st}$ sink device 1750 and a $2^{nd}$ sink device 1760 may be able to simultaneously output the AV data received from a specific source. For instance, assume that the $1^{st}$ sink device 1750 is activating a specific AV file from a DVD player.

Since all devices are connected together using an integrated wire interface proposed by the present invention, the $2^{nd}$ sink device 1760 may be able to collect information on the AV file currently activated by the $1^{st}$ sink device 1750. Moreover, a host of performing this function shall be described in detail with reference to FIG. 28 later.

Since the specific AV file transmitted from the DVD player is being delivered to the $1^{st}$ sink device 1750 via the switching module 1770, the $2^{nd}$ sink device 1760 may receive the same AV file from the switching module 1770 as well.

According to another embodiment of the present invention described with reference to FIGS. 14 to 18, a TV situated in a bed room of one home and a TV situated in a living room thereof may simultaneously receive data from the same source device. Moreover, if a monitoring function is added, it may be advantageous in that a TV situated in a room mainly used by a child is controlled through another TV in another room.

Figure 19:
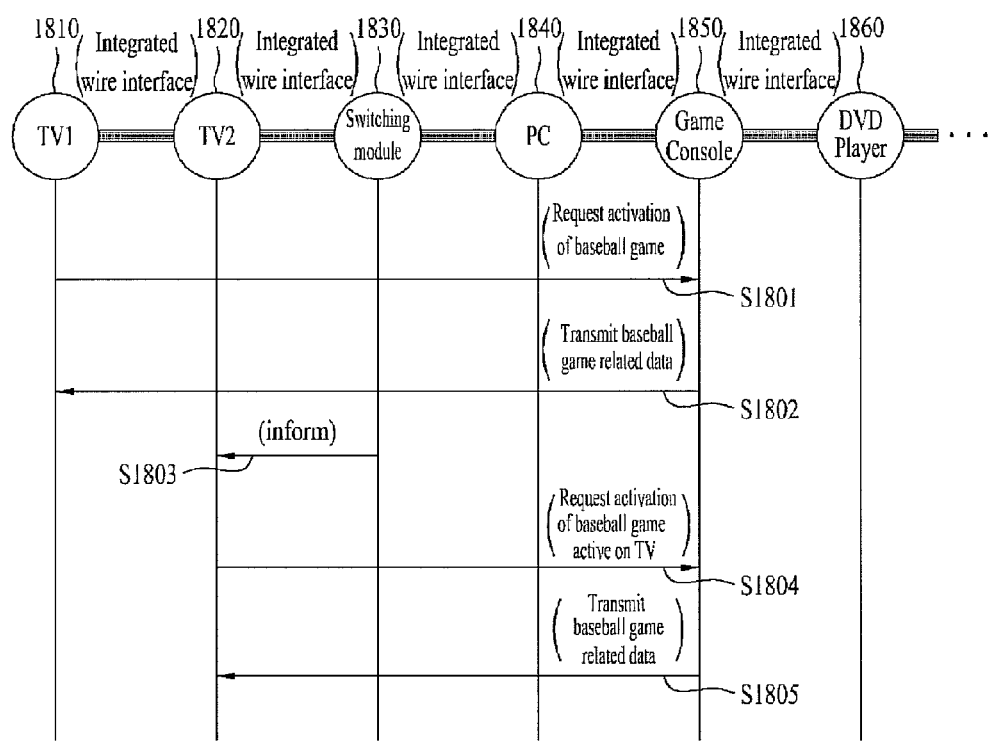
FIG. 19 is a flowchart of a data flow between the components of the system shown in FIG. 14.

FIG. 19 is a flowchart of a data flow between the components of the system shown in FIG. 14. In the following description, explained with reference to FIG. 19 is a data flow between the components of the system shown in FIG. 14.

First of all, assume that 2 sink devices 1810 and 1820 are connected with a hardware 1830 including a switching module via an integrated wire interface, as shown in FIG. 14 and FIG. 15. Moreover, the hardware 1830 including the switching module, a $1^{st}$ source device 1840 (e.g., PC), a $2^{nd}$ source device 1850 (e.g., a game console) and a $3^{rd}$ source device 1860 (e.g., a DVD player) are connected together via the integrated wire interface.

Referring to FIG. 19, the $1^{st}$ sink device 1810 transmits a baseball game activation signal to the $2^{nd}$ source device 1850 via the hardware 1830 including the switching module [S1801]. In this case, it may design the $1^{st}$ source device 1840 to be bypassed.

The $2^{nd}$ source device 1850 transmits baseball game related data to the $1^{st}$ sink device 1810 via the hardware 1830 [S1802]. In doing so, the hardware 1830 delivers the information, which indicates that the baseball game related data has been transmitted, to the $2^{nd}$ sink device 1820 [S1803].

Having checked the information, the $2^{nd}$ sink device 1820 transmits a baseball game activation request signal to the $2^{nd}$ source device 1850 [S1804]. Subsequently, the second source device 1850 transmits the baseball game related data to the $2^{nd}$ sink device 1820 [S1805].

Figure 20:
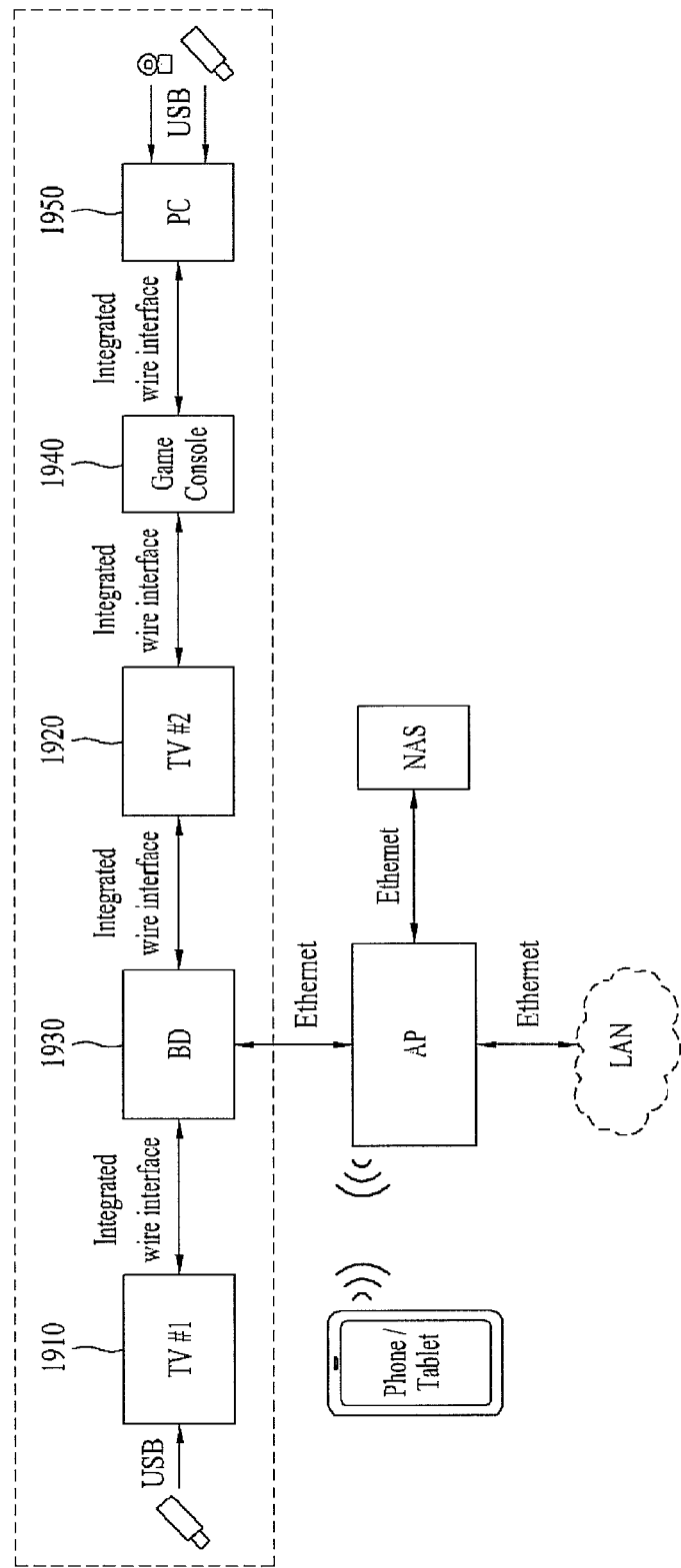
FIG. 20 is a detailed block diagram of a total system having a plurality of sink devices connected with a plurality of source devices using an integrated interface according to a further embodiment of the present invention.

FIG. 20 is a detailed block diagram of a total system having a plurality of sink devices connected with a plurality of source devices using an integrated interface according to a further embodiment of the present invention. In the following description, explained with reference to FIG. 20 is a total system having a plurality of sink devices connected with a plurality of source devices using an integrated interface according to a further embodiment of the present invention. Compared to FIG. 14, FIG. 20 shows that a hardware including a switching module is advantageously unnecessary. Of course, the above-mentioned integrated wire interface may be similarly applicable to the configuration shown in FIG. 20.

Referring to FIG. 20, using an integrated wire interface according to one embodiment of the present invention, a $1^{st}$ sink device 1910, a $1^{st}$ source device 1930, a $2^{nd}$ sink device 1920, a $2^{nd}$ source device 1940 and a $3^{rd}$ source device 1950 are sequentially connected with one another.

Yet, in FIG. 20, TV #1 is shown as one example of the $1^{st}$ sink device 1910, BD (Blu-ray disc) player is shown as one example of the $2^{nd}$ sink device 1920, a game console is shown as one example of the $2^{nd}$ source device 1940, and a PC is shown as one example of the $3^{rd}$ source device 1950.

Compared to FIG. 14, FIG. 20 shows that a hardware including a switching module is unnecessary. Yet, in order for a plurality of sink devices to use AV data saved in a source device, it may be necessary to modify the above-described integrated wire interface. This shall be described in detail with reference to FIG. 21 as follows.

Figure 21:
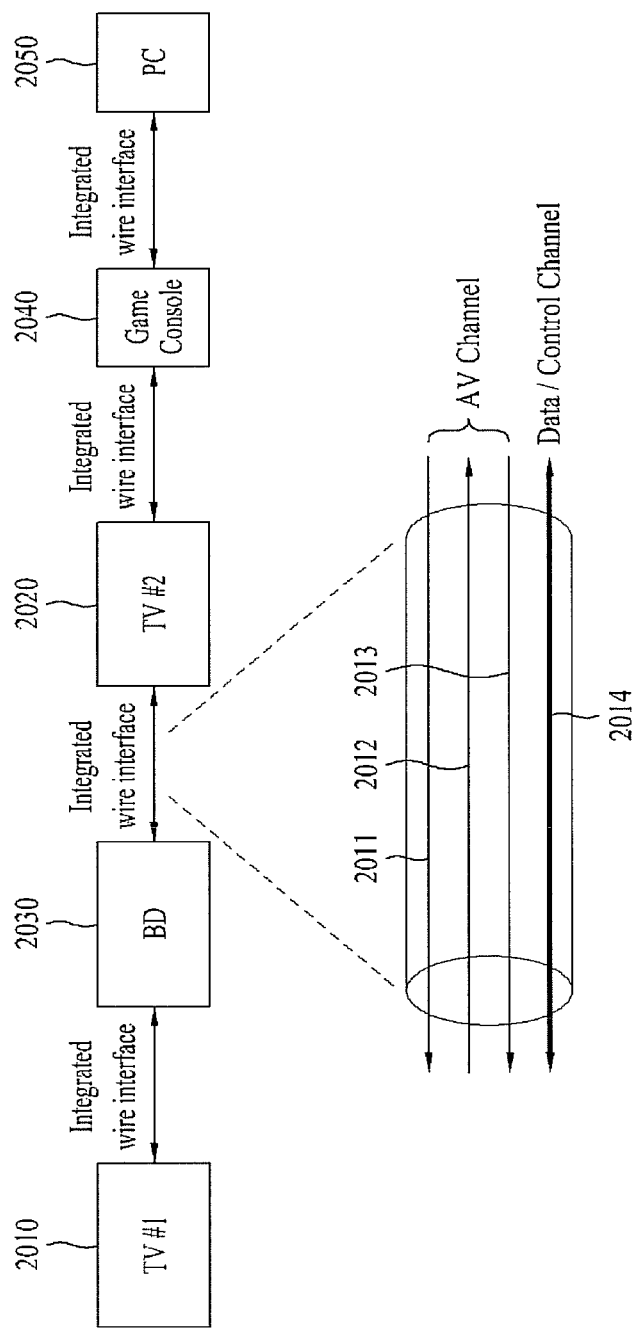
FIG. 21 is a detailed diagram of a physical channel of an integrated wire interface if a plurality of the sink devices shown in FIG. 20 are connected in series to one another.

FIG. 21 is a detailed diagram of a physical channel of an integrated wire interface if a plurality of the sink devices shown in FIG. 20 are connected in series to one another.

Like FIG. 20, FIG. 21 shows that a $1^{st}$ sink device 2010, a $1^{st}$ source device 2030, a $2^{nd}$ sink device 2020, a $2^{nd}$ source device 2040 and a $3^{rd}$ source device 2050 are sequentially connected via an integrated wire interface.

Particularly, FIG. 21 shows a physical channel of the integrated wire interface in detail.

In order to play a role as the switching module described in the former embodiment, AV physical channel of the integrated wire interface should be increased. In particular, although the bi-directional data/control channel may be maintained as one line 2014 shown in FIG. 21, a plurality of physical AV channel lines 2011, 2012 and 2013 are necessary to deliver AV data to a plurality of sink devices without the switching module.

FIG. 21 is the diagram prepared on the assumption of three physical AV channel lines, which is just exemplary. And, if necessary, it is apparent to those skilled in the art that the design of the integrated wire interface having more AV channel lines may apply to the present invention to come within the scope of the appended claims and their equivalents.

Figure 22:
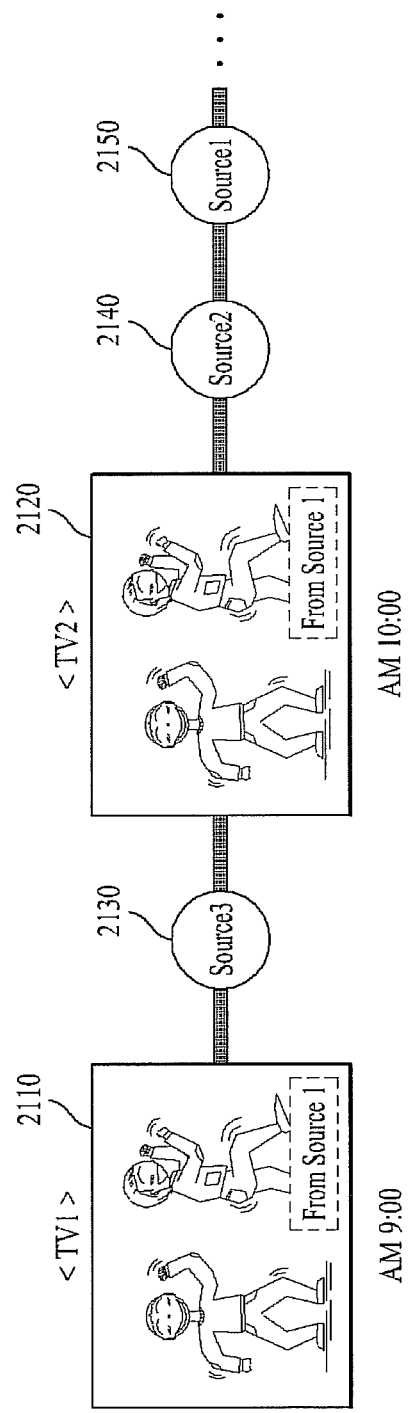
FIG. 22 is a diagram for screens of a plurality of the sink devices shown in FIG. 20, in which a plurality of the sink devices output data by receiving the data from the same source device at different timing points, respectively.

FIG. 22 is a diagram for screens of a plurality of the sink devices shown in FIG. 20, in which a plurality of the sink devices output data by receiving the data from the same source device at different timing points, respectively. In the following description, explained with reference to FIG. 22 are screens of a plurality of the sink devices shown in FIG. 20, in which a plurality of the sink devices output data by receiving the data from the same source device at different timing points, respectively.

Referring to FIG. 22, a $1^{st}$ sink device 2110, a $3^{rd}$ source device 2130, a $2^{nd}$ sink device 2120, a $2^{nd}$ source device 2140 and a $1^{st}$ source device 2150 are connected with one another via an integrated wire interface. In particular, the integrated wire interface shown in FIG. 22 may correspond to the integrated wire interface having a plurality of AV channel lines shown in FIG. 21.

For instance, the $1^{st}$ sink device 2110 receives specific AV data from the $1^{st}$ source device 2150 and then outputs the received specific AV data around 9 AM. After elapse of 1 hour, the 2$^{nd}$ sink device 2120 receives the same AV data from the 1$^{st}$ source device 2150 and then outputs the received AV data around 10 AM.

This is possible because of the following reason. Namely, if the above-described integrated wire interface shown in FIG. 21 is equipped with a plurality of AV channel lines, AV data can be received from the same source without channel interference.

Figure 23:
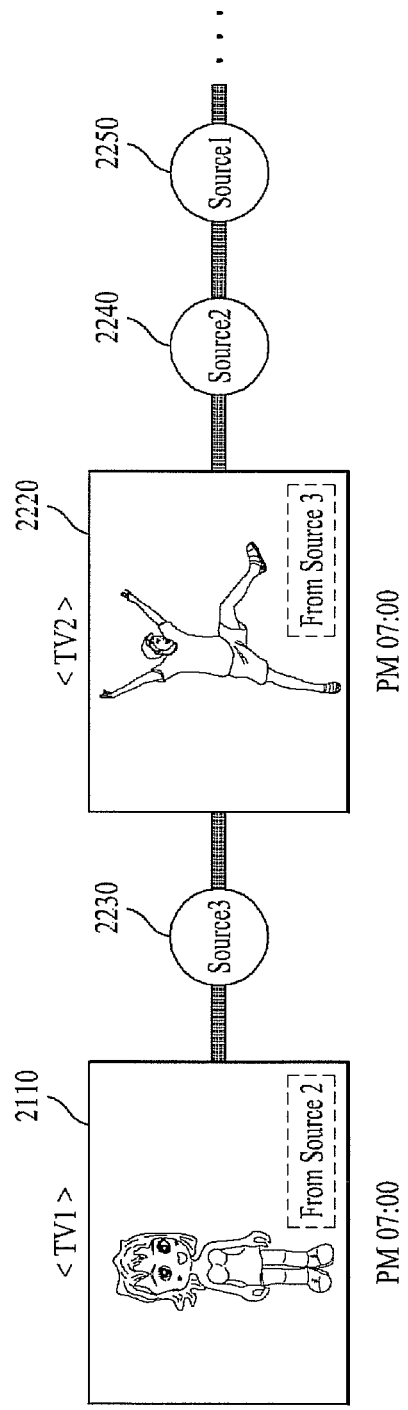
FIG. 23 is a diagram for screens of a plurality of the sink devices shown in FIG. 20, in which a plurality of the sink devices output data by receiving the data from a plurality of source devices at the same timing points, respectively.

FIG. 23 is a diagram for screens of a plurality of the sink devices shown in FIG. 20, in which a plurality of the sink devices output data by receiving the data from a plurality of source devices at the same timing points, respectively. In the following description, explained with reference to FIG. 23 are screens of a plurality of the sink devices shown in FIG. 20, in which a plurality of the sink devices output data by receiving the data from a plurality of source devices at the same timing points, respectively.

Referring to FIG. 23, a 1$^{st}$ sink device 2210, a 3$^{rd}$ source device 2230, a 2$^{nd}$ sink device 2220, a 2$^{nd}$ source device 2240 and a 1$^{st}$ source device 2250 are connected with one another via an integrated wire interface. In particular, the integrated wire interface shown in FIG. 23 may correspond to the integrated wire interface having a plurality of AV channel lines shown in FIG. 21.

For instance, the 1$^{st}$ sink device 2210 receives specific AV data from the 2$^{nd}$ source device 2240 and then outputs the received specific AV data around 7 PM. At the same time (i.e., around 7 PM), the 2$^{nd}$ sink device 2220 receives different AV data from the 3$^{rd}$ source device 2230 and then outputs the received AV data around 10.

This is possible because of the following reason. Namely, if the above-described integrated wire interface shown in FIG. 21 is equipped with a plurality of AV channel lines, AV data can be simultaneously received from different sources irrespective of whether AV channel is set for uni-direction.

Figure 24:
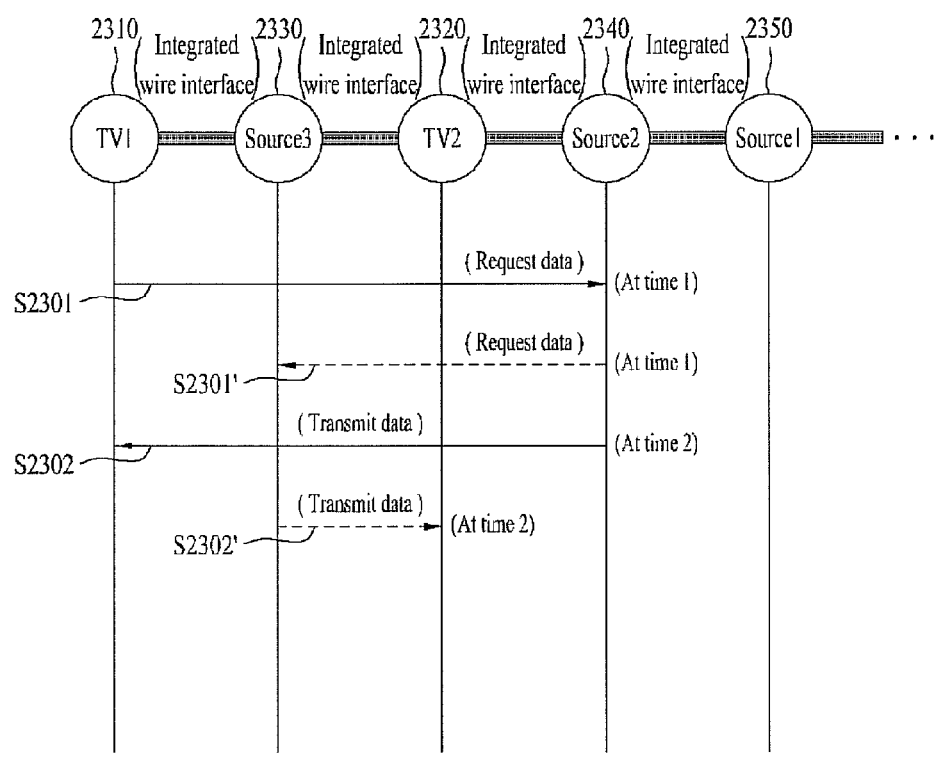
FIG. 24 is a flowchart of a data flow between the components of the system shown in FIG. 20.

FIG. 24 is a flowchart of a data flow between the components of the system shown in FIG. 20. In the following description, explained with reference to FIG. 24 is a data flow between the components of the system shown in FIG. 20.

First of all, assume that a 1$^{st}$ sink device 2310, a 3$^{rd}$ source device 2330, a 2$^{nd}$ sink device 2320, a 2$^{nd}$ source device 2340 and a 1$^{st}$ source device 2350 are sequentially connected via an integrated wire interface. Particularly, the integrated wire interface physically includes a plurality of the AV channel lines shown in FIG. 20 or FIG. 21.

Referring to FIG. 24, the 1$^{st}$ sink device 2310 makes a request for specific data to the 2$^{nd}$ source device at Time 1 [S2301]. At time 1, the 2$^{nd}$ sink device 2320 makes a request for specific data to the 3$^{rd}$ source device 2330 [S2301'].

At Time 2, the 2$^{nd}$ source device 2340 transmits the requested AV data to the 1$^{st}$ sink device 2310 [S2302]. At the same time (i.e., Time 2), the 3$^{rd}$ source device 2330 transmits the requested AV data to the 2$^{nd}$ sink device 2320 [S2302'].

Figure 25:
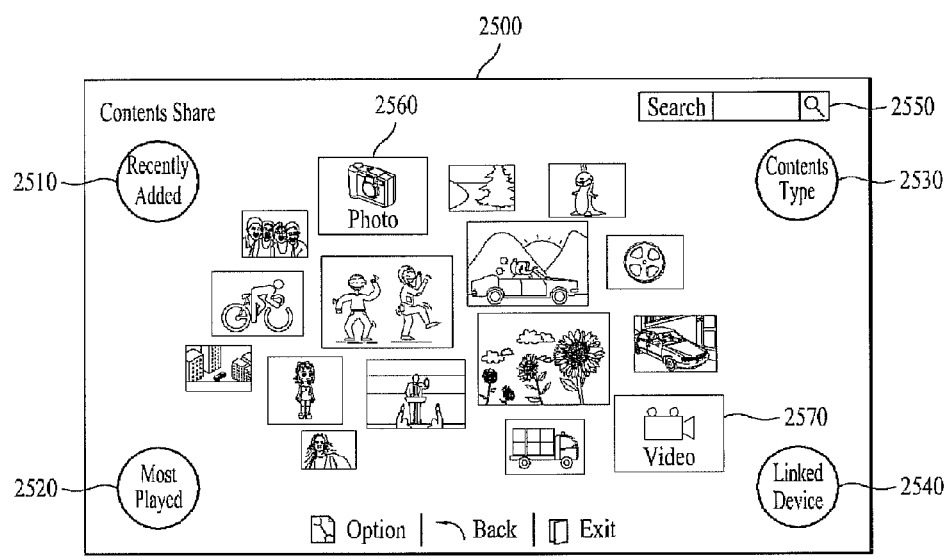
FIG. 25 is a diagram for one example of a main screen of Contents Share activated by a sink device according to a $2^{nd}$ embodiment of the present invention.

FIG. 25 is a diagram for one example of a main screen of Contents Share activated by a sink device according to a 2$^{nd}$ embodiment of the present invention. In the following description, explained with reference to FIG. 25 is one example of a main screen of Contents Share activated by a sink device according to a 2$^{nd}$ embodiment of the present invention.

Assume that a sink device 2500 shown in FIG. 25 is connected with at least one or more source devices via the integrated wire interface described with reference to FIGS. 1 to 24. In this case, the sink device 2500 may correspond to one of a TV, a DTV, a smart TV, an HBBTV, an IPTV and the like.

Referring to FIG. 25, the sink device 2500 makes a request for metadata of a content previously saved in each source device via a uni-directional control line of the integrated wire interface according to one embodiment of the present invention. In particular, the metadata may include a title of each content, a file format of each content, a created time and date of each content, thumbnail image data of each content and the like for example.

Having received the thumbnail image data of the respective contents, the sink device 2500 displays all contents previously saved in the source devices in a random manner, as shown in the central part of FIG. 25. Yet, a random content may not have the thumbnail image data. If so, with reference to information on the file format of the metadata, a 1$^{st}$ icon 2560 previously saved in the sink device 2500 is displayed in case of a photo file. Moreover, in case of a video file, a 2$^{nd}$ icon 2570 previously saved in the sink device 2500 is displayed.

Meanwhile, if the number of source devices connected via the integrated wire interface geometrically increases or the contents saved in each of the source devices are excessively large, a user of the sink device 2500 may have difficulty in selecting and accessing a content desired by the user with ease.

In order to solve this problem, a keyword search option 2550 may be provided. Since title information or tag information representing each content is contained in the content metadata received from the source device, if a specific keyword is inputted via the keyword search option 2550, the content having the corresponding title or tag information is identifiably displayed. This may pertain to the scope of the appended claims and their equivalents.

Moreover, the sink device 2500 additionally provides 4 kinds of subfunctions to raise the user's convenience. A 1$^{st}$ subfunction 2510 is an option of identifiably displaying contents recently added to the source device, which shall be described in detail with reference to FIG. 35 and FIG. 36 later.

A 2$^{nd}$ subfunction 2520 is an option of identifiably displaying a most frequently accessed content among a plurality of contents saved in the source device, which shall be described in detail with reference to FIG. 37 later. And, a 3$^{rd}$ subfunction 2530 is an option of collecting and displaying contents per source device connected via an integrated wire interface, which shall be described in detail with reference to FIG. 38 and FIG. 39 later.

Moreover, a 4$^{th}$ subfunction 2540 is an option of sorting and displaying contents saved in the source device connected via an integrated wire interface, which shall be described in detail with reference to FIG. 40 and FIG. 41 later.

Figure 26:
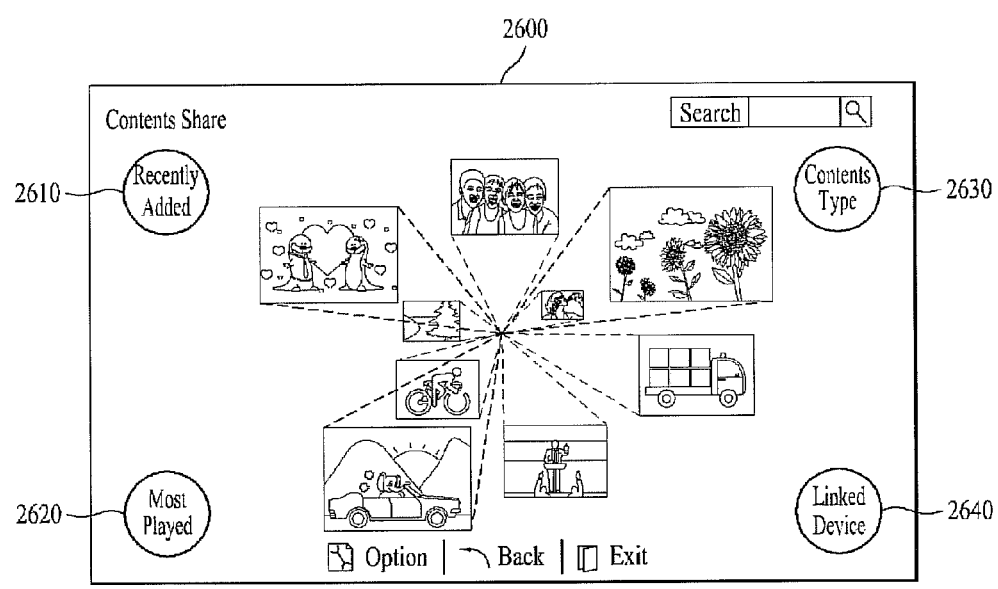
FIG. 26 is a diagram for another example of a main screen of Contents Share activated by a sink device according to a $2^{nd}$ embodiment of the present invention.

FIG. 26 is a diagram for another example of a main screen of Contents Share activated by a sink device according to a 2$^{nd}$ embodiment of the present invention. In the following description, explained with reference to FIG. 26 is another example of a main screen of Contents Share activated by a sink device according to a 2$^{nd}$ embodiment of the present invention.

Compared to FIG. 25, FIG. 26 identically shows that a sink device 2600 has a 1$^{st}$ subfunction 2610, a 2$^{nd}$ subfunction 2620, a 3$^{rd}$ subfunction 2630 and a 4$^{th}$ subfunction 2640.

Unlike the former sink device shown in FIG. 25, the sink device 2600 shown in FIG. 26 is designed to display a thumbnail image of a different format. In particular, the thumbnail images shown in FIG. 26 are displayed with 3D effect. For instance, by predetermined priority, a thumbnail image of a content having a highest priority is displayed in a manner of being enlarged in biggest size, a thumbnail image of a content having a second highest priority is displayed in a manner of being enlarged in second-biggest size, and a thumbnail image of a content having a lowest priority is displayed in a manner of being enlarged in smallest size.

The predetermined priority is set to give an order in a manner of combining at least one of a source device saved date, an accessed count, a recently played date and the like together and a thumbnail image size is determined in the given order, which pertains to the scope of the appended claims and their equivalents. Moreover, the present embodiment may be implemented using a data table shown in FIG. 29.

Figure 27:
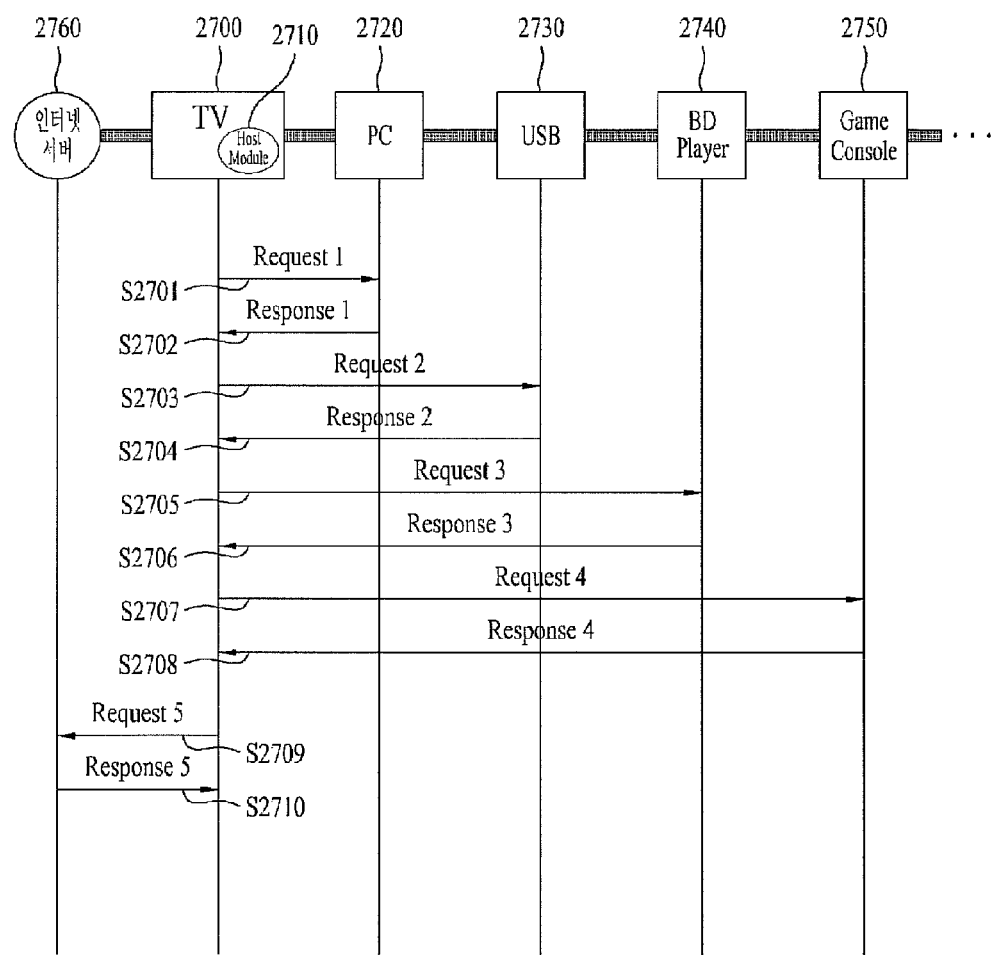
FIG. 27 is a flowchart of a data communication process in sink device, source device and internet server according to a $2^{nd}$ embodiment of the present invention.

FIG. 27 is a flowchart of a data communication process in sink device, source device and internet server according to a $2^{nd}$ embodiment of the present invention. In the following description, explained with reference to FIG. 27 is a data communication process in sink device, source device and internet server according to a $2^{nd}$ embodiment of the present invention. Particularly, FIG. 27 suggests a solution for a case that a content saved in a source device does not have thumbnail image data.

Referring to FIG. 27, assume that a sink device 2700 and source devices 2720, 2730, 2740 and 2750 are connected via the above-mentioned integrated wire interface. The sink device 2700 is connected with an internet server 2760 via network and may be able to access a webpage or receive IP data. The sink device 2700 includes a separate host module 2710 to monitor data communications with each of the source devices and statuses of other sink devices. The components of the host module 2710 will be described in detail with reference to FIG. 28 later.

The sink device 2700 makes a request for metadata of contents previously saved in the $1^{st}$ source device 2720 via bi-directional data line of the integrated wire interface [S2701]. In this case, the metadata may include thumbnail image data of each content. Meanwhile, since the data transmitted in the step S2701 contains rxID and txID for example, as shown in FIG. 6 or FIG. 7, it is advantageous in that the sink device 2700 is able to easily check that the received metadata is received from which source device. Subsequently, the $1^{st}$ source device 2720 transmits the metadata of the contents saved in the memory to the sink device 2700 in response to the request made in the step S2701 [S2702]. As mentioned in the foregoing description, the metadata may include the thumbnail image data. Yet, occasionally, some contents may include no thumbnail image data. A corresponding solution will be described in the steps S2709 and the step S2710 later.

As mentioned in the foregoing description, the steps S2701 and S2702 of transmitting and receiving the data between the sink device 2700 and the $1^{st}$ source device may identically apply to the steps S2703 and S2704 of transmitting and receiving data between the sink device 2700 and the $2^{nd}$ source device 2730, the steps S2705 and S2706 of transmitting and receiving data between the sink device 2700 and the $3^{rd}$ source device 2740 and the steps S2707 and S2708 of transmitting and receiving data between the sink device 2700 and the $4^{th}$ source device 2750. And, the redundant description shall be omitted from the following description. Therefore, the sink device 2700 may be designed to save a table configured with the data shown in FIG. 29 in a memory using the metadata received from the respective source devices.

Meanwhile, in case that thumbnail image data is not included in each content metadata received from the source device, the sink device 2700 is designed to download related thumbnail image data by accessing a random internet server 2760.

For instance, suing the title information included in the metadata, the sink device 2700 makes a request for the thumbnail image data corresponding to the title information to the server 2760 [S2709]. If the thumbnail image data corresponding to the title information exists, the server 2760 is designed to transmit the corresponding thumbnail image data to the sink device 2700 [S2710].

Therefore, it is advantageous in that a user of the sink device 2700 does not need to separately search for contents (saved in the source device) having no thumbnail images.

Figure 28:
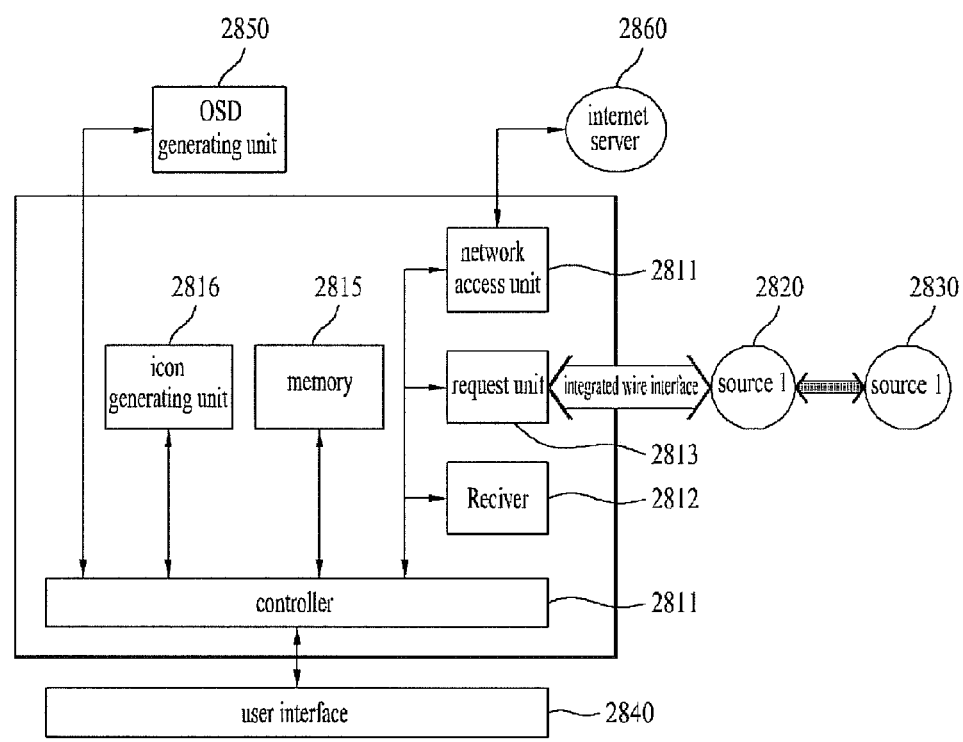
FIG. 28 is a detailed block diagram of a host module of a sink device according to a $2^{nd}$ embodiment of the present invention.

FIG. 28 is a detailed block diagram of a host module of a sink device according to a $2^{nd}$ embodiment of the present invention. In the following description, explained in detail with reference to FIG. 28 is a host module of a sink device according to a $2^{nd}$ embodiment of the present invention.

First of all, a sink device according to a $2^{nd}$ embodiment of the present invention includes a host module 2810 and an OSD generating unit 2850 and further includes other modules in addition. In particular, the host module 2810 includes a controller 2811, a receiving unit 2812, a request unit 2813, a network access unit 2814, a memory 2815, an icon generating unit 2816 and the like.

The receiving unit 2812 and the request unit 2813 are connected with an external $1^{st}$ source device (source 1) 2820 and an external $2^{nd}$ source device (source device 2) 2830 via an integrated wire interface and are designed to enable bi-directional data communications.

For instance, if the command for activating the contents share function shown in FIG. 25 or FIG. 26 is inputted via a user interface 2840, the controller 2811 controls the request unit 2813 to make a request for metadata of each content to each of the source devices 2820 and 2830. Meanwhile, 'Contents Share' used in this specification means a function of collecting and displaying contents saved in source devices. 'Contents Share' may be substituted with such a terminology as 'all share', 'simultaneous share' and the like for example. And, these terminologies may non-limit the scope of the appended claims and their equivalents.

Meanwhile, the user interface 2840 may include a motion remote controller for example, which will be described in detail with reference to FIG. 33 and FIG. 34 later.

If the receiving unit 2812 receives the metadata from the source devices 2820 and 2830, the controller 2811 saves the received metadata in the memory 2815. The controller 2811 may include a CPU or the like. And, the memory 2815 may include at least one of a flash memory, RAM, ROM and the like for example.

The icon generating unit 2816 generates a unique icon using each content thumbnail image data saved in the memory 2815. And, the OSD generating unit 2850 generates an OSD by adjusting a size, position and shape of the icon generated by the icon generating unit 2816 using the metadata saved in the memory 2815.

Meanwhile, if the thumbnail image data is not included in the metadata, the controller 2811 is designed to control the network access unit 2814 to download the corresponding thumbnail image data from the internet server 2860. For instance, if a title of a content having not thumbnail image data is a professional baseball, the network access unit 2814 accesses the internet server 2860, searches for the thumbnail image data having the title of the professional baseball, and then receives the found thumbnail image data. Subsequently, the received thumbnail image data may be saved in the memory 2815.

FIG. 29 is a diagram of a format of data collected from a source device by a sink device according to a $2^{nd}$ embodiment of the present invention. In the following description, explained with reference to FIG. 29 is a format of data collected from a source device by a sink device according to a $2^{nd}$ embodiment of the present invention.

First of all, a sink device according to a 2$^{nd}$ embodiment of the present invention may be able to receive metadata from source devices via bi-directional data line of an integrated wire interface. In this case, the metadata may mean side information on contents saved in a memory of each of the source devices. In particular, the metadata may include at least one of a title, a file format, a creation (saved) time and date and a thumbnail image data.

In the course of transmitting or receiving metadata between a sink device and a source device, as shown in FIG. 6 or FIG. 7, since rxID information and txID information are included in the metadata, the sink device may be able to identify that the metadata of a specific content is received from which source device. Meanwhile, as mentioned in the foregoing description, the metadata of some contents may not include the side information corresponding to thumbnail image data.

In this case, two kinds of embodiments may be taken into consideration. A 1$^{st}$ embodiment relates to a solution for giving a representative image of a specific icon previously saved in a sink device in accordance with a file format of a corresponding content. For instance, an icon of representing a video is designated as a thumbnail image according to avi. file. For another instance, an icon of representing a photo is designated as a thumbnail image according to jpg. file.

According to a 2$^{nd}$ embodiment, a sink device connectible with an internet network accesses a server, receives thumbnail image data corresponding to a tile, and then saves the received thumbnail image data in a memory, using metadata indicating the title of a corresponding content.

Information on the most recently accesses time and date is not received from a source device. Instead, if a random content is outputted to a sink device, a timing point of the output is added and saved in the table shown in FIG. 29.

Figure 30:
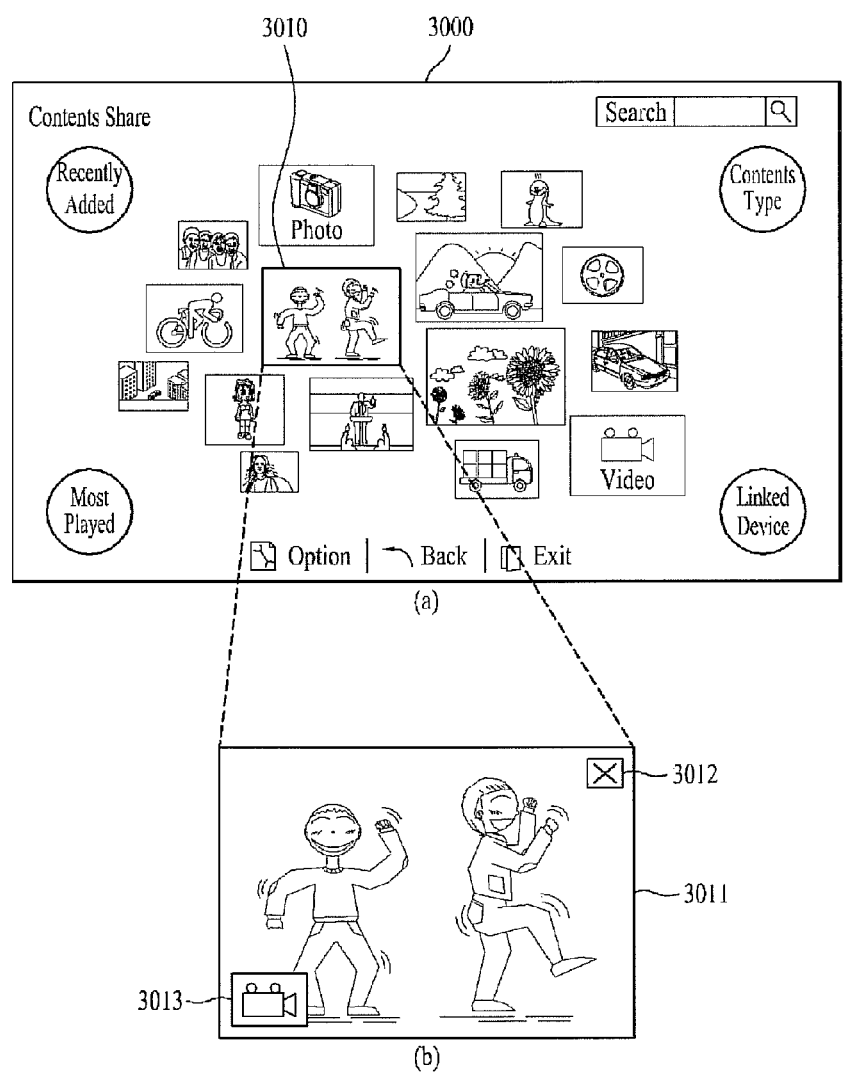
FIG. 30 is a diagram of an enlarged thumbnail image of the main screen shown in FIG. 25 or FIG. 26.

FIG. 30 is a diagram of an enlarged thumbnail image of the main screen shown in FIG. 25 or FIG. 26. In the following description, explained with reference to FIG. 30 is an enlarged thumbnail image of the main screen activated in accordance with the function 'Contents Share'.

Referring to FIG. 30, if the above-mentioned contents share function is activated, a sink device 3000 is designed to display thumbnail images in metadata of contents received from source devices connected via an integrated wire interface [FIG. 30 (a)]. FIG. 30 (b) shows that a random thumbnail image data 3010 shown in FIG. 30 (a) is enlarged and displayed.

Referring to FIG. 30 (b), each thumbnail image data 3011 includes 2 kinds of side graphic data 3012 and 3013. The 1$^{st}$ side graphic data 3012 is generated by the icon generating unit 2816 or the OSD generating unit 2850 described with reference to FIG. 28. The 1$^{st}$ side graphic data 3012 is designed as an option selectable by a user of the sink device 3000. If the 1$^{st}$ side graphic data 3012 is selected, it may be deleted from the contents share screen. In particular, according to this design, it may be able to freely edit the excessive number of contents receivable from source devices or files not desired by the user.

The 2$^{nd}$ side graphic data 3013 is designed to vary in accordance with a file format of a content. For instance, using the table (saved in the memory 2815 shown in FIG. 28) shown in FIG. 29, a file format of each content may be identified. Hence, the OSD generating unit 2850 shown in FIG. 28 combines an identifier, which identifies a video content, a music content, a photo content or the like, with thumbnail image data with reference to the table (saved in the memory 2815) shown in FIG. 29.

FIG. 31 is a diagram of a process for displaying side information on a thumbnail image of the main screen shown in FIG. 25 or FIG. 26. In the following description, explained with reference to FIG. 31 is a process for displaying side information of a thumbnail image displayed on a main screen activated in accordance with the contents share function.

Referring to FIG. 31 (a), a sink device 3100 is designed to display thumbnail images in the metadata of contents received from source devices connected via an integrated wire interface.

Using a remote controller 3150 capable of outputting a pointing signal, it may be able to select a random thumbnail image data 3110. In order to give a feedback effect to a user, a cross shape may be displayed at a point indicated by the remote controller 3150. Of course, the cross shape is just exemplary. And, the present invention may basically cover the modifications and variations of the display shape provided they come within the scope of the appended claims and their equivalents. The remote controller 3150 capable of outputting the pointing signal will be described in detail with reference to FIG. 33 and FIG. 34 later.

In order to facilitate the identification of a number of contents displayed on a contents share screen, it may be necessary to generate secondary feedback data. For instance, assuming that a pointing signal of the remote controller is situated in a specific thumbnail image region, a secondary feedback data may be designed to be displayed as shown in FIG. 31 (b). In particular, while an original thumbnail image 311 is displayed only, if the pointing signal of the remote controller is situated over predetermined duration, a graphic data 3113 of side information is designed to be outputted as well as the original thumbnail image 3111. In this case, the side information is received from a source device or may be receivable via an internet server. The OSD generating unit 2850 shown in FIG. 28 generates graphic data using the received side information.

Figure 32:
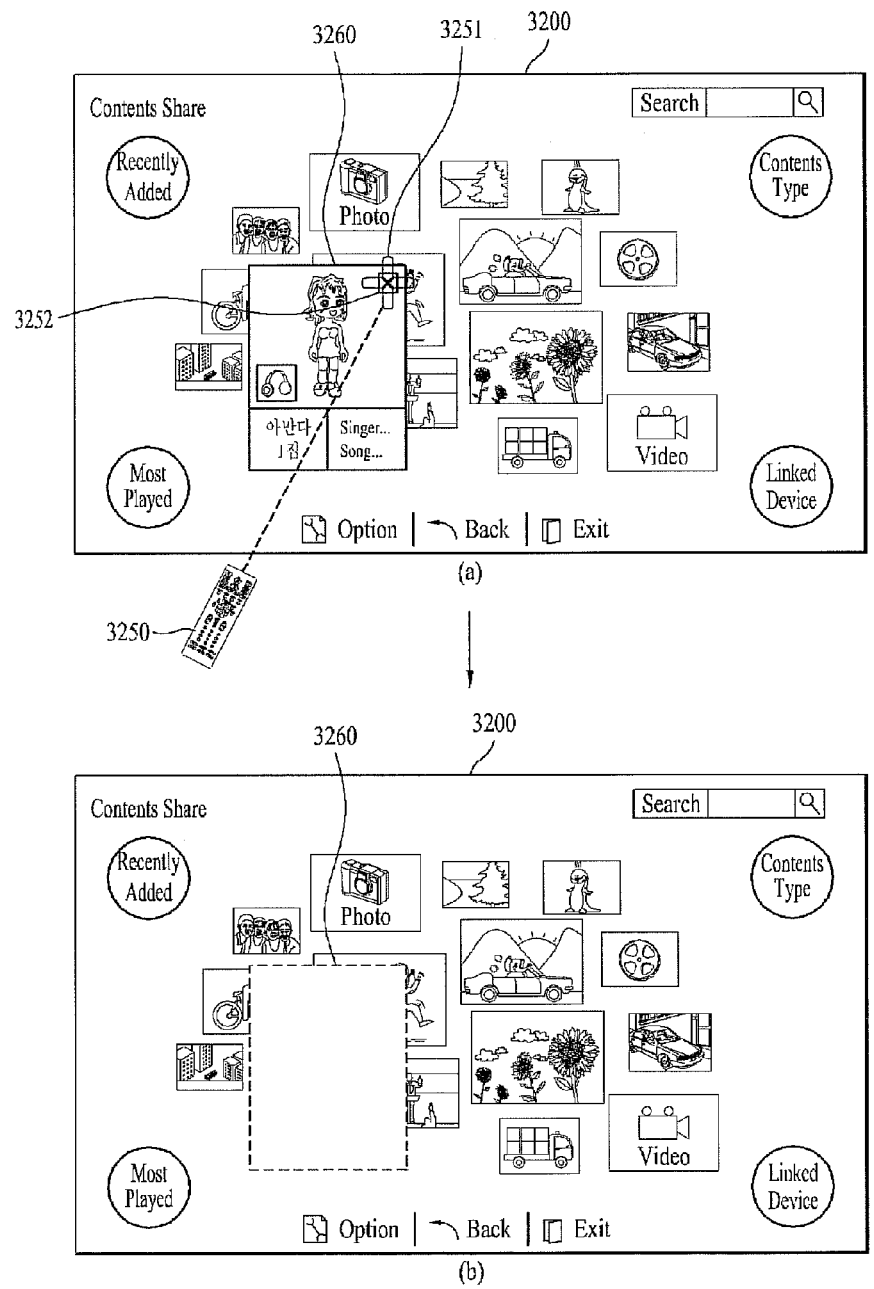
FIG. 32 is a diagram of a process for deleting a thumbnail image from the main screen shown in FIG. 25 or FIG. 26.

FIG. 32 is a diagram of a process for deleting a thumbnail image from the main screen shown in FIG. 25 or FIG. 26. In the following description, explained with reference to FIG. 32 is a process for deleting a specific thumbnail image from thumbnail images displayed on a main screen activated in accordance with the contents share function.

Referring to FIG. 32 (a), a sink device 3200 is designed to display thumbnail images in the metadata of contents received from source devices connected via an integrated wire interface. As mentioned in the foregoing description, if a remote controller 3250 capable of outputting a pointing signal is situated within a region of a specific thumbnail image 3260, side information (e.g., Amanda 1$^{st}$ album, singer. Song, etc.) is displayed together.

Referring to FIG. 32 (a), if a cross indicator 3251 indicated by the pointing signal is situated within an option region 3252 for deleting the thumbnail image data, a sink device 3201 substitutes a part of a region 3260 of the corresponding thumbnail image data with a black screen. Instead of the substitution with the black screen, the corresponding thumbnail image data may be removed from the contents share screen only, which may pertain to the scope of the appended claims and their equivalents.

Figure 33:
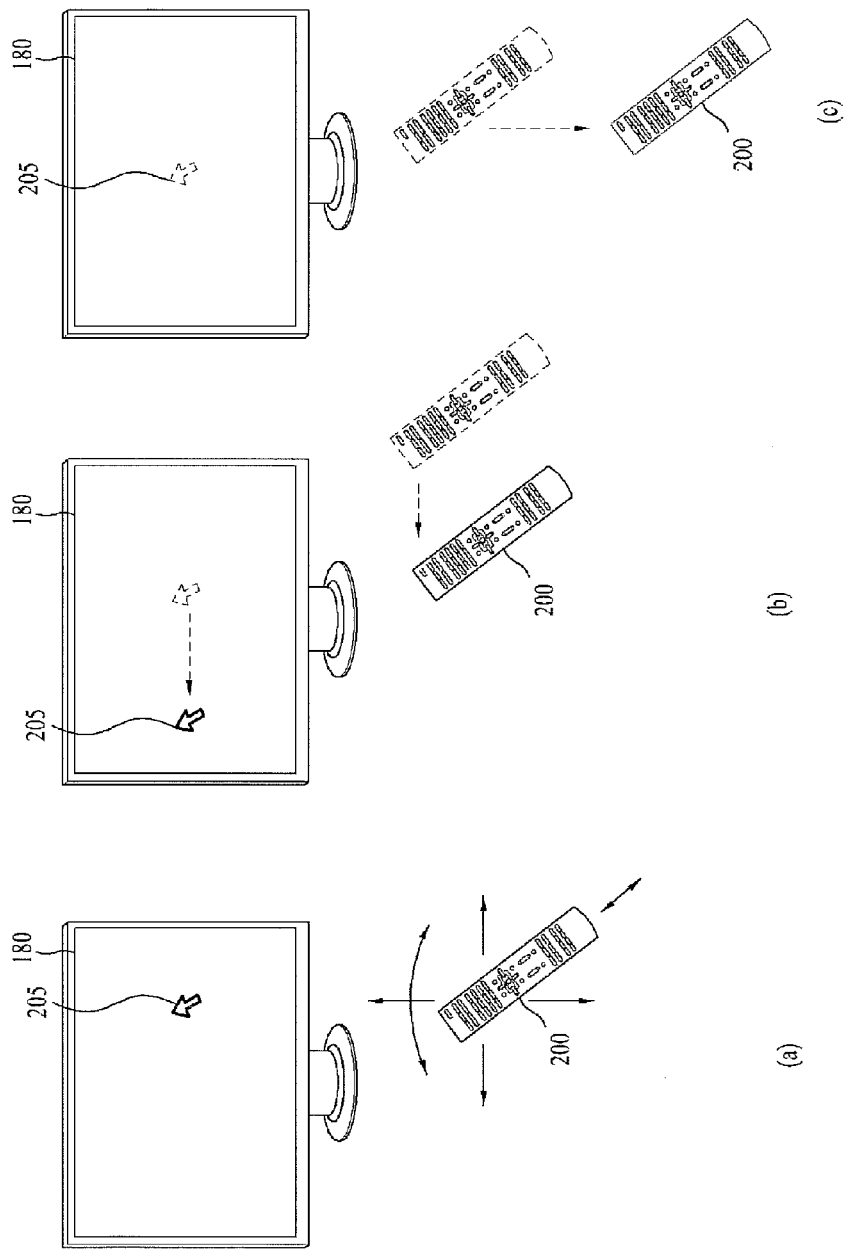
FIG. 33 is a diagram for a method of controlling a remote controller configured to control a sink device according to a $2^{nd}$ embodiment of the present invention.

FIG. 33 is a diagram for a method of controlling a remote controller configured to control a sink device according to a 2$^{nd}$ embodiment of the present invention. In the following description, explained with reference to FIG. 33 is a method of controlling a remote controller configured to control a sink device according to a 2$^{nd}$ embodiment of the present invention.

Referring to FIG. 33 (a), a pointer 205 corresponding to a remote controller 200 is displayed on a display unit 180. In particular, the display unit 180 may correspond to one of a sink device, a TV and the like for example.

A user may be able to move or rotate the remote controller 200 up & down, right and left [FIG. 33 (*b*)], or back & forth [FIG. 33 (*c*)]. The pointer 205 displayed on the display unit 180 of a display device corresponds to a motion of the remote controller 200. Since the corresponding pointer 205 is displayed by moving in accordance with a motion in 3D space, this remote controller 200 may be named a space remote controller.

Referring to FIG. 33 (*b*), if a user moves the remote controller 200 in left direction, the pointer 205 displayed on the display unit 180 of the display device moves in left direction to correspond to a motion of the remote controller 200.

Information on the motion of the remote controller 200 sensed via a sensor of the remote controller 200 is transmitted to the display device. Subsequently, the display device may be able to calculate coordinates of the pointer 205 from the information on the motion of the remote controller 200. And, the display device may be able to display the pointer 205 to correspond to the calculated coordinates.

Referring to FIG. 33 (*c*), while a specific button within the remote controller 200 is pressed, a user shifts the remote controller 200 in a manner of getting away from the display unit 180. If so, a selected region within the display unit 180 corresponding to the pointer 205 may be enlarged and displayed by zoom-in. On the contrary, if a user shifts the remote controller 200 in a manner of getting closer to the display unit 180, a selected region within the display unit 180 corresponding to the pointer 205 may be reduced and displayed by zoom-out. Alternatively, if the remote controller 200 gets away from the display unit 180, the selected region may zoom out. If the remote controller 200 gets closer to the display unit 180, the selected region may zoom in.

Meanwhile, while a specific button in the remote controller 200 is pressed, recognition of up & down motion or right & left motion may be excluded. In particular, if the remote controller 200 moves to get away from or get closer to the display unit 180, both of the up & down motion and the right & left motion may not be recognized but the back & forth motion may be recognized only. While a specific button in the remote controller 200 is not pressed, the pointer 205 is shifted only in accordance with the up & down motion or right & left motion of the remote controller 200. And, a moving speed/direction of the pointer 205 may correspond to a moving speed/direction of the remote controller 200.

Meanwhile, a pointer mentioned in this specification may mean an object display on the display unit 180 in response to a motion of the remote controller 200. Hence, the pointer 205 may be displayed as objects in various shapes as well as the arrow shape shown in the drawing. For instance, the various shapes may include a point, a cursor, a prompt, a thick outline and the like. The pointer 205 may be displayed to correspond to a prescribed point on a vertical or horizontal axis on the display unit 180. Alternatively, the pointer 205 may be displayed to correspond to a plurality of points including a line, a surface and the like.

Moreover, using the remote controller 200, it may be able to control overall options of the above-mentioned contents share. In particular, it may be advantageous in facilitating selection and editing of specific thumbnail image data.

Figure 34:
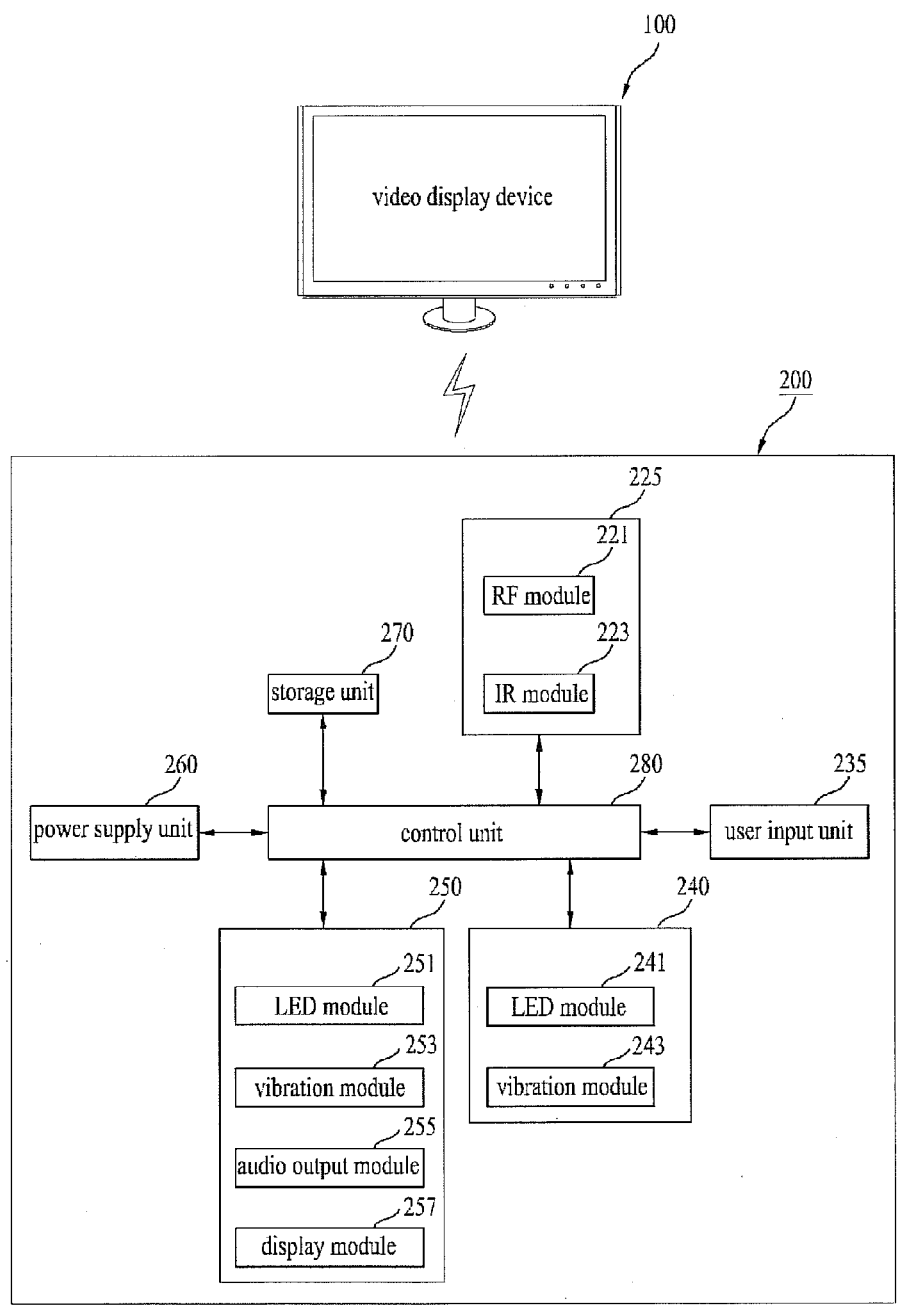
FIG. 34 is a block diagram of a remote controller configured to control a sink device according to a $2^{nd}$ embodiment of the present invention.

FIG. 34 is a block diagram of a remote controller configured to control a sink device according to a $2^{nd}$ embodiment of the present invention. In the following description, explained in detail with reference to FIG. 34 is an inner module of a remote controller configured to control a sink device according to a $2^{nd}$ embodiment of the present invention.

Referring to FIG. 34, a remote controller 200 may include a wires communication unit 225, a user input unit 235, a sensor unit 240, an output unit 250, a power supply unit 260, a storage unit 270 and a control unit 280.

The wireless communication unit 225 transceives signals with a random one of the display devices according to the embodiments of the present invention mentioned in the foregoing description. As mentioned in the foregoing description, the display devices may include a TV, a DTV, a smart TV and the like.

According to the present embodiment, the remote controller 200 may include an RF module 221 capable of transceiving signals with the display device 100 by RF communication specifications. And, the remote controller 200 may include an IR module 223 capable of transceiving signals with the display device 100 by IR communication specifications.

According to the present embodiment, the remote controller 200 may transmit a signal containing information on a motion of the remote controller 200 and the like to the display device 100 via the RF module 221.

And, the remote controller 200 may receive a signal transmitted by the display device 100 via the RF module 221. If necessary, the remote controller 200 may transmit a command for power-on/off, channel switching, volume adjustment or the like to the display device 100 via the IR module 223. Moreover, the remote controller 200 may receive a command signal for selecting or editing a thumbnail image of a specific content to the display device 100 via the IR module 223.

The user input unit 235 may include at least one of a keypad, a button, a touch pad, a touchscreen and the like. A user may be able to input a command related to the display device 100 to the remote controller 200 by manipulating the user input unit 235. If the user input unit 235 includes a hard key button, a user may be able to input a command related to the display device 100 to the remote controller 200 by pushing the hard key button. If the user input unit 235 includes the touchscreen, a user may be able to input a command related to the display device 100 to the remote controller 200 by touching a soft key of the touchscreen. The user input unit 235 may include various kinds of input means (e.g., a scroll key, a jog key, etc.) to be manipulated by a user, by which the scope of the appended claims and their equivalents may be non-limited.

The sensor unit 240 may include a gyro sensor 241 or an acceleration sensor 243. In particular, the gyro sensor 241 may sense information on a motion of the remote controller 200.

For instance, the gyro sensor 241 may be able to sense information on a motion of the remote controller 200 with reference to x, y and z axes. The acceleration sensor 243 may be able to sense information on a moving speed of the remote controller 200 and the like. The sensor unit 240 may further include a distance measuring sensor to sense a distance from the display unit 180. Hence, a plurality of the thumbnail image data displayed on the contents share screen, as shown in FIG. 26, may be edited with 3D effect.

The output unit 250 may be able to output a video or audio signal to correspond to a manipulation of the user input unit 235 or the signal transmitted by the display device 100. Through the output unit 250, a user may be able to recognize whether the user input unit 235 is manipulated or whether display device 100 is controlled.

For instance, the output unit 250 may include an LED module 251 turned on if the user input unit 235 is manipulated or a signal is transceived with the display unit 100 via the wireless communication unit 225. For instance, the output unit 250 may include a vibration module 253 generating vibration if the user input unit 235 is manipulated or a signal is transceived with the display unit 100 via the wireless communication unit 225. For instance, the output unit 250 may include an audio output module 255 outputting an audio if the user input unit 235 is manipulated or a signal is transceived with the display unit 100 via the wireless communication unit 225. For instance, the output unit 250 may include a display module 257 outputting a video if the user input unit 235 is manipulated or a signal is transceived with the display unit 100 via the wireless communication unit 225.

The power supply unit 260 supplies the remote controller 200 with power. If the remote controller 200 does not move for predetermined duration, the power supply unit 260 cuts off the power supply to save power consumption. If a prescribed key provided to the remote controller 200 is manipulated, the power supply unit 260 may be able to resume the power supply.

The storage unit 270 may store various kinds of programs required for controlling or operating the remote controller 200, application data and the like. If the remote controller 200 transceives signals with the display device 100 by wireless via the RF module 221, the remote controller 200 and the display device 100 transceive signals with each other on a prescribed frequency band. In particular, the control unit 280 of the remote controller 200 saves information on a frequency band for transceiving signals by wireless with the display device 100 paired with the remote controller 200 and the like and may then refer to the saved information.

The control unit 280 controls overall items related to the control of the remote controller 200. The controller 280 may be able to transmit a signal corresponding to a prescribed key manipulation of the user input unit 235 or a signal corresponding to a remote controller motion sensed by the sensing unit 240 to the display device 100 via the wireless communication unit 225.

FIG. 35 is a diagram for one example of a process for activating a $1^{st}$ subfunction of the sink device shown in FIG. 25 or FIG. 26. In the following description, explained with reference to FIG. 35 is one example of a process for identifiably displaying contents recently added to a source device only.

Referring to FIG. 35 (a), if a contents share function is activated, a sink device 3500 displays thumbnail image data included in metadata of a content received from a source device. Yet, in case that the number of the thumbnail image data shown in FIG. 35 (a) reaches several tens or hundreds, a user may have difficulty in checking a specific thumbnail image 3510 desired by the user.

If an option corresponding to a $1^{st}$ subfunction displayed on a left top end of a screen is selected, referring to FIG. 35 (b), a sink device 3511 enlarges and displays a thumbnail image data 3511 corresponding to a most recently added content.

Meanwhile, for example of a reference for detecting a recently added content, two examples may be taken into consideration. According to a $1^{st}$ example, a reference value is set with reference to a timing point of saving a random content in a source device. Hence, contents currently saved in a source device may be collected within a prescribed time (e.g., a day ago, a week ago, etc.) from a timing point of activating a contents share function.

According to a $2^{nd}$ example, a memory status in a previous activation of a contents share function is compared with a memory status in a current activation of the contents share function. For instance, after data of displaying $1^{st}$ content and a $2^{nd}$ content only have been saved in the memory in the event of the previous activation of the contents share function, if data of displaying a $3^{rd}$ content and a $4^{th}$ content are saved in the memory in the event of the current activation of the contents share function as well, the sink device sets the $3^{rd}$ content and the $4^{th}$ content to be recognized as recently added contents.

FIG. 36 is a diagram for another example of a process for activating a $1^{st}$ subfunction of the sink device shown in FIG. 25 or FIG. 26. In the following description, explained with reference to FIG. 36 is another example of a process for identifiably displaying contents recently added to a source device only.

FIG. 36 shows a method of displaying a plurality of added contents, whereas FIG. 35 shows the case of adding one content recently.

Referring to FIG. 36 (a), if a contents share function is activated, a sink device 3600 displays thumbnail image data included in metadata of contents received from a source device.

If an option corresponding to a $1^{st}$ subfunction displayed on a left top end of a screen is selected, referring to FIG. 36 (b), a sink device 3601 displays a plurality of thumbnail image data corresponding to a plurality of most recently added contents, respectively.

In particular, if a plurality of contents are added within a preset time (e.g., 1 hour ago, 1 day ago, etc.), prioritization is adopted in order to specifically identify a plurality of the contents added within the preset time.

For instance, the OSD generating unit displays a thumbnail image 3610 corresponding to a $1^{st}$ content, which is most recently added, in a largest size. And, the OSD generating unit displays a thumbnail image 3620 corresponding to a $2^{nd}$ content, which is recently added, in a $2^{nd}$ largest size.

The OSD generating unit displays a thumbnail image 3630 corresponding to a $3^{rd}$ content, which is most recently added, in a $3^{rd}$ largest size. The OSD generating unit displays a thumbnail image 3640 corresponding to a $4^{th}$ content, which is most recently added, in a $4^{th}$ largest size. And, the OSD generating unit displays a thumbnail image 3650 corresponding to a $5^{th}$ content, which is most recently added, in a $5^{th}$ largest size.

Figure 37:
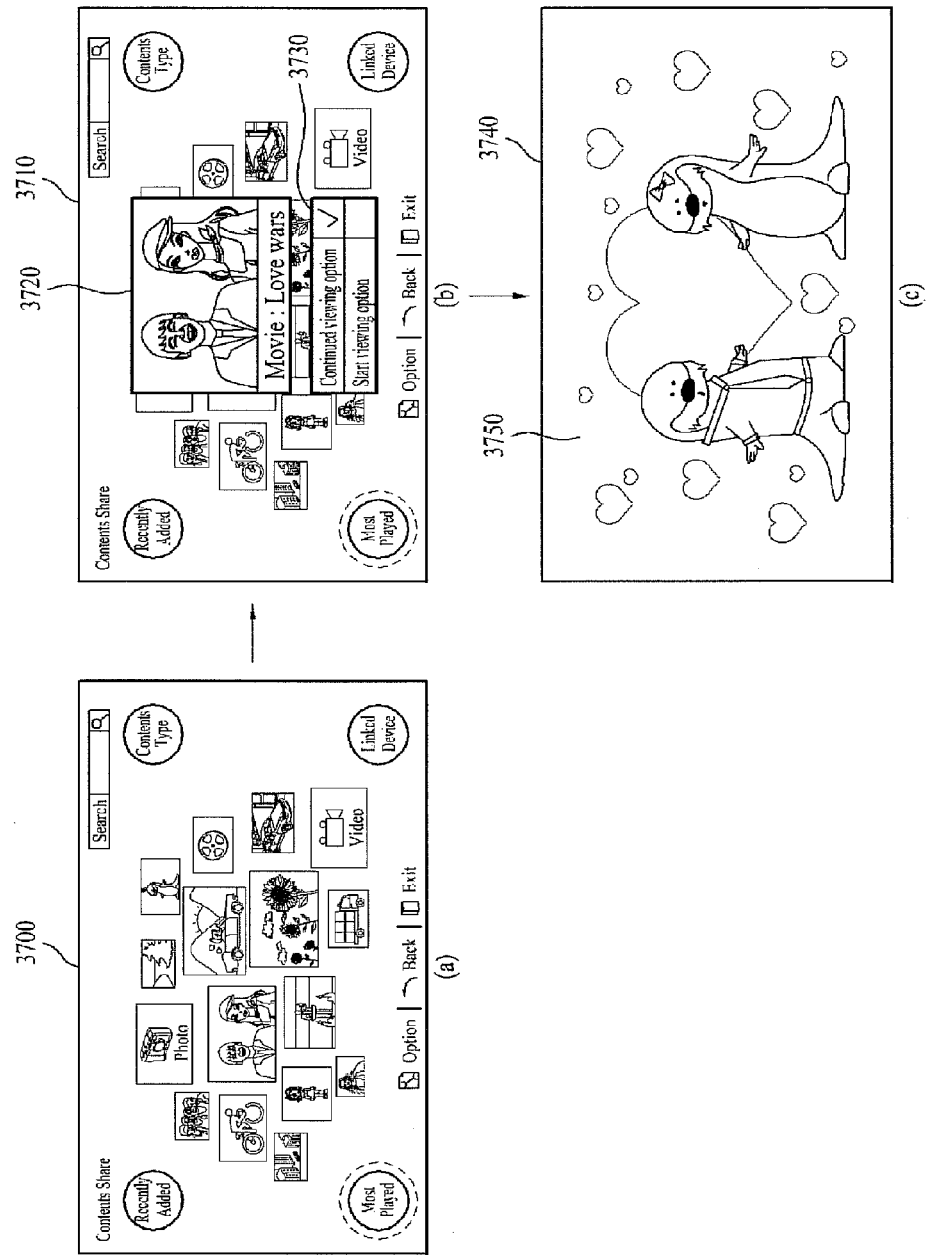
FIG. 37 is a diagram of a process for activating a $2^{nd}$ subfunction of the sink device shown in FIG. 25 or FIG. 26.

FIG. 37 is a diagram of a process for activating a $2^{nd}$ subfunction of the sink device shown in FIG. 25 or FIG. 26. In the following description, explained with reference to FIG. 37 is a process for identifiably displaying a most frequently accessed content among contents saved in a source device.

Referring to FIG. 37 (a), if a contents share function is activated, a sink device 3700 displays thumbnail image data included in metadata of contents received from a source device.

If an option corresponding to a $2^{nd}$ subfunction displayed on a left bottom end of a screen is selected, referring to FIG. 37 (b), a sink device 3710 enlarges and displays a thumbnail image data 3720 corresponding to a most frequently accessed content. In doing so, an OSD generating unit may be designed to reduce sizes of the rest of the thumbnail image data or delete the rest of the thumbnail image data from the screen.

A sink device according to a $2^{nd}$ embodiment of the present invention counts the number of activation of each content, the number of playing each content and the number of accesses of each content and then saves result values of the counted numbers in a memory. If a currently played specific content is stopped intentionally or due to malfunction, a timing point of the stop is saved as a tag in the memory. Therefore, it may be able to provide an option 3730 of calling a previously viewed final screen or viewing the specific content from the beginning [FIG. 37 (b)].

If a user of the sink device 3710 selects a continuous viewing option, the sink device 3740 may be designed to display the corresponding content from a scene 3750 previously stopped being played, as shown in FIG. 37 (c), using tag information (i.e., data indicating a timing point of the stop in the course of play) of the corresponding content saved in the memory.

FIG. 38 is a diagram for one example of a process for activating a $3^{rd}$ subfunction of the sink device shown in FIG. 25 or FIG. 26. In the following description, explained with reference to FIG. 38 is one example of an option of collecting and displaying contents per source device connected via an integrated wire interface.

Referring to FIG. 38 (a), if a contents share function is activated, a sink device 3800 randomly displays thumbnail image data included in metadata of contents received from a source device.

If an option corresponding to a $3^{rd}$ subfunction displayed on a right bottom end of a screen is selected, referring to FIG. 38 (b), a sink device 3801 is designed to display a list 3810 of source devices currently connected via an integrated wire interface.

FIG. 39 is a diagram for another example of a process for activating a $3^{rd}$ subfunction of the sink device shown in FIG. 25 or FIG. 26. In the following description, explained with reference to FIG. 39 is another example of an option of collecting and displaying contents per source device connected via an integrated wire interface.

Referring to FIG. 39 (a), if a specific source device (e.g., USB) is selected from a list 3910 displayed by a sink device 3900 according to a $2^{nd}$ embodiment of the present invention, the sink device 3910 is designed to display the screen shown in FIG. 39 (b).

In particular, the sink device 3901 enlarges and displays thumbnail images 3912, 3913 and 3914 corresponding to contents received from USB source device only and deletes the rest of thumbnails images corresponding to contents received from other source devices or outputs the rest of the thumbnail images by adjusting a contrast ratio, as shown in FIG. 39 (b), for example. As mentioned in the foregoing description, this design is available because the sink device can be aware that a corresponding content is received from which source. This is fully explained in the descriptions with reference to FIG. 6, FIG. 7 and FIG. 29 and the redundant description will be omitted.

Figure 40:
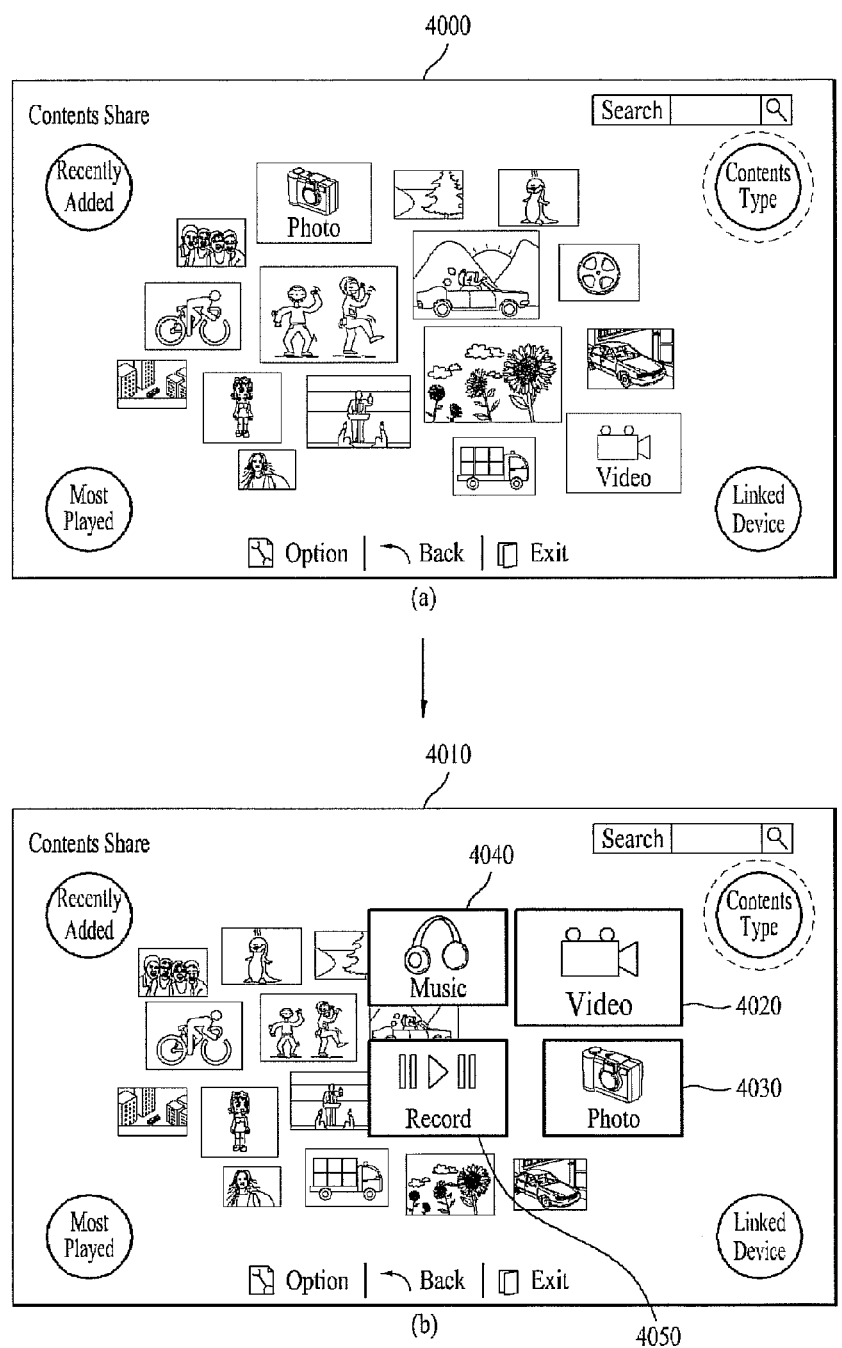
FIG. 40 is a diagram for one example of a process for activating a $4^{th}$ subfunction of the sink device shown in FIG. 25 or FIG. 26.

FIG. 40 is a diagram for one example of a process for activating a $4^{th}$ subfunction of the sink device shown in FIG. 25 or FIG. 26. In the following description, explained with reference to FIG. 40 is one example of an option of sorting and displaying contents saved in a source device connected via an integrated wire interface by file format.

Referring to FIG. 40 (a), if a contents share function is activated, a sink device 4000 randomly displays thumbnail image data included in metadata of contents received from a source device.

If an option corresponding to a $4^{th}$ subfunction displayed on a right top end of a screen is selected, referring to FIG. 40 (b), a sink device 4010 displays OSDs 4020, 4030, 4040 and 4050 of 4 regions representing file formats, respectively. The OSDs are generated by the OSD generating unit and may be designed using the data of the memory shown in FIG. 29.

Besides, previous thumbnail image data are designed to overlap with each other in part or to be shifted in specific direction (e.g., left direction) of the screen, which may pertain to the scope of the appended claims and their equivalents. This design may bring an advantage of maintaining user's visibility.

Figure 41:
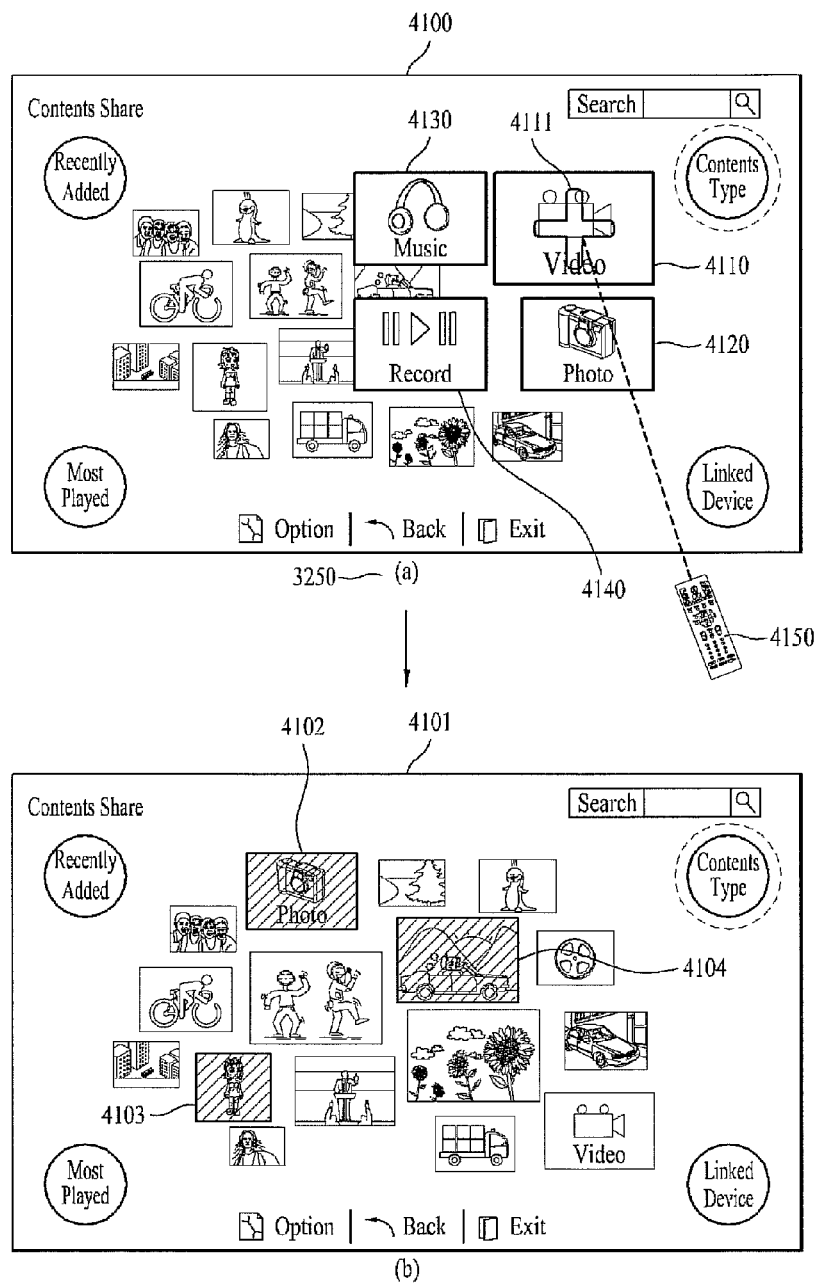
FIG. 41 is a diagram for another example of a process for activating a $4^{th}$ subfunction of the sink device shown in FIG. 25 or FIG. 26.

FIG. 41 is a diagram for another example of a process for activating a $4^{th}$ subfunction of the sink device shown in FIG. 25 or FIG. 26. In the following description, explained with reference to FIG. 41 is another example of an option of sorting and displaying contents saved in a source device connected via an integrated wire interface by file format. And, assume that the following description is based on the description with reference to FIG. 40.

Referring to FIG. 41 (a), a sink device 4100 displays OSDs 4110, 4120, 4130 and 4140 of 4 regions representing file formats, respectively. If a cross shape 4111 indicating a pointing signal is situated on the OSD 4110 representing a video file format using a remote controller 4150, the OSD shown in FIG. 41 (b) is displayed.

In particular, the controller 2811 shown in FIG. 28 access the memory 2815 and then determines file formats of the respective contents. In doing so, assume that the memory 2815 stores the table shown in FIG. 29.

Therefore, under the control of the controller 2811, the OSD generating unit 2850 shown in FIG. 28 generates an OSD of enlarging and displaying contents 4102, 4103 and 4104 of the video file format only. The rest of the contents not in the video file format are displayed in relatively small size, as shown in FIG. 41 (b), whereby the contents of the user-specific format are emphatically displayed. Optionally, according to another embodiment of the present invention, the rest of the contents not in the video file format may be designed not to be displayed at all, which pertains to the scope of the appended claims and their equivalents.

Although the above description is made using different drawings for clarity, it may be able to implement a new embodiment by combining the embodiments described with reference to the drawings. And, it is apparent to those skilled in the art to design a recoding medium readable by a computer in which programs for executing the above-mentioned embodiments are recorded. This pertains to the scope of the rights of the present invention.

The display apparatus and operating method thereof according to the aforementioned embodiments of this invention may be achieved by combination of structural elements and features of this invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of this invention.

Meanwhile, the display apparatus operating methods according to this invention may be implemented in a recording medium readable by a processor provided to a display apparatus with processor-readable codes. The processor-readable media may include all kinds of recording devices in which data readable by a processor are stored. The processor-readable media may include ROM, RAM, CD-ROM, magnetic tapes, floppy discs, optical data storage devices, and the like for example and may also include carrier-wave type implementations (e.g., transmission via Internet). Moreover, the processor-readable recording medium may be distributed on network-connected computer systems to save and execute processor-readable codes by distributed processing.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

And, both of the apparatus invention and the method invention are described in this specification. Moreover, the description of both inventions may be supplemented with each other.

What is claimed is:

1. A method of processing content in a first display device, which is connected with a plurality of source devices through a single remote controller, the method comprising:
   transmitting a first signal requesting listing information to the plurality of source devices, the listing information including data for at least one content previously saved and shareable in the plurality of source devices;
   receiving the listing information from the plurality of source devices;
   displaying the received listing information on a screen;
   transmitting a second signal requesting a first content to a selected source device;
   receiving the first content from the selected source device;
   decoding and outputting the received first content on the screen;
   receiving a first notification signal including information on second content displayed on a second display device, and second notification signal including information on a second source device transmitting the second content to the second display device;
   displaying the received first and second notification information on the screen;
   transmitting a third signal requesting the second content based on both the first and second notification information to the second source device; and
   receiving the second content from the second source, and decoding and outputting the received second content on the screen,
   wherein the first display device outputs a graphic user interface (GUI) for shareable contents in all source devices connected to the first display device on the screen,
   wherein the outputted GUI includes a plurality of thumbnail images for the shareable contents,
   wherein the outputted GUI further includes a first control icon for arranging one or more thumbnail images based on a content type from the plurality of thumbnail images, a second control icon for arranging one or more thumbnail images based on a device type from the plurality of thumbnail images, a third control icon for arranging one or more thumbnail images according to most accessed from the plurality of thumbnail images, and a fourth control icon for arranging one or more thumbnail images according to recently added to the corresponding device from the plurality of thumbnail images, and
   wherein the first display arranges and outputs the plurality of thumbnail images according to a selected control icon.

2. The method of claim 1, wherein the listing information includes information for identifying each of the plurality of source devices connected to the first display device and information for identifying each of the plurality of the display devices connected to the first display device.

3. A first display device, which is connected with a plurality of source devices through a single remote controller, the first display device comprising:
   a transmitting module configured to transmit a first signal requesting listing information to the plurality of source devices, the listing information including data for at least one content previously saved and shareable in the plurality of source devices, to transmit a second signal requesting for a first content to a selected source device, and to transmit a third signal requesting a second content to a second source device;
   a receiving module configured to receive the listing information from the plurality of source devices, to receive the first content from the selected source device, to receive a first notification information on a second content displayed on the second display device, and a second notification information on a second source which transmits the second content displayed on the second display device, and to receive the second content from the second source device; and
   a display module configured to display the received listing information, the first content and the second content on a screen,
   wherein the first display device outputs a graphic user interface (GUI) for shareable contents in all source devices connected to the first display device on the screen,
   wherein the outputted GUI includes a plurality of thumbnail images for the shareable contents and control icons,
   wherein the outputted GUI further includes a first control icon for arranging one or more thumbnail images based on a content type from the plurality of thumbnail images, a second control icon for arranging one or more thumbnail images based on a device type from the plurality of thumbnail images, a third control icon for arranging one or more thumbnail images according to most accessed from the plurality of thumbnail images, and a fourth control icon for arranging one or more thumbnail images according to recently added to the corresponding device from the plurality of thumbnail images, and
   wherein the display module arranges and outputs the plurality of thumbnail images according to a selected control icon.

4. The display device of claim 3, wherein the transmitting module and the receiving module include a middleware and hardware interface.

5. The method of claim 1, wherein the listing information includes a thumbnail image of the requested first content.

6. The method of claim 1, wherein a selection of one of the control icons generates one or more additional thumbnail images based on the selected control icon.

7. The display device of claim 3, wherein the listing information includes a thumbnail image of the requested first content.

8. The display device of claim 3, wherein a selection of one of the control icons generates one or more additional thumbnail images based on the selected control icon.

* * * * *